United States Patent [19]
Ouchi

[11] Patent Number: 5,967,669
[45] Date of Patent: Oct. 19, 1999

[54] ROLLING BEARING UNIT WITH ROTATIONAL SPEED SENSOR

[75] Inventor: Hideo Ouchi, Fujisawa, Japan

[73] Assignee: NSK Ltd., Tokyo, Japan

[21] Appl. No.: 08/948,238

[22] Filed: Oct. 9, 1997

[30] Foreign Application Priority Data

Oct. 11, 1996 [JP] Japan .................................. 8-269788
Dec. 9, 1996 [JP] Japan .................................. 8-328800

[51] Int. Cl.$^6$ ............................................. F16C 19/08
[52] U.S. Cl. ................................ 384/448; 324/207.25
[58] Field of Search ........................ 384/448; 324/173, 324/174, 166, 207.25

[56] References Cited

U.S. PATENT DOCUMENTS

| | | | |
|---|---|---|---|
| 5,004,358 | 4/1991 | Varvello et al. | 384/446 |
| 5,195,830 | 3/1993 | Caillault et al. | 384/448 |
| 5,231,391 | 7/1993 | Rigaux | 340/448 |
| 5,264,790 | 11/1993 | Moretti et al. | 384/448 X |
| 5,293,124 | 3/1994 | Caillaut et al. | 324/173 |
| 5,309,094 | 5/1994 | Rigaux et al. | 324/174 |
| 5,421,654 | 6/1995 | Rigaux et al. | 384/448 |
| 5,434,503 | 7/1995 | Rigaux et al. | 324/174 |
| 5,438,260 | 8/1995 | Rigaux et al. | 324/166 |
| 5,622,436 | 4/1997 | Morita et al. | 384/448 |
| 5,628,570 | 5/1997 | Sahashi et al. | 384/448 |

| | | | |
|---|---|---|---|
| B1 5,200,697 | 6/1996 | Adler et al. | 324/174 |

FOREIGN PATENT DOCUMENTS

| | | |
|---|---|---|
| 0 518 157 | 12/1992 | European Pat. Off. . |
| 0 714 029 | 5/1996 | European Pat. Off. . |
| 2 301 014 | 9/1976 | France . |
| 2 675 861 | 10/1992 | France . |
| 2 675 862 | 10/1992 | France . |
| 2 702 567 | 9/1994 | France . |
| 42 31 033 | 4/1993 | Germany . |
| 4-102062 | 9/1992 | Japan . |
| 7-29467 | 6/1995 | Japan . |
| 7-29468 | 6/1995 | Japan . |
| 8-43411 | 2/1996 | Japan . |
| 8-122351 | 5/1996 | Japan . |

Primary Examiner—Thomas R. Hannon
Attorney, Agent, or Firm—Evenson, McKeown, Edwards & Lenahan, PLLC

[57] ABSTRACT

Outer peripheral portions of magnetizing terminals 39a constituting a magnetizing apparatus 33a for magnetizing a permanent magnet 32, are made longer than inner peripheral portions. Coils 40 for magnetization are wound around the shorter length inner peripheral portions. A distance L32 between the magnetizing terminals 39a and a step portion 37 of a support ring 34 can thus be shortened, so that the axial length of the encoder 31a can be reduced. This results in reducing the axial length of an encoder 31a to thereby miniaturize and lighten a speed sensing rolling bearing unit incorporating the encoder 31a.

6 Claims, 17 Drawing Sheets

ROLLING BEARING UNIT WITH ROTATIONAL SPEED SENSOR

FIELD OF THE INVENTION

The present invention relates to a rolling bearing unit fitted with a rotational speed sensor (referred to hereunder often as a speed sensing rolling bearing unit) used for supporting a wheel of a vehicle on a suspension unit so as to be freely rotatable, and for sensing the rotational speed of the wheel. Moreover, the invention relates to improvements in a magnetizing apparatus used for making an encoder which is incorporated into the rotational speed sensing device.

DESCRIPTION OF THE BACKGROUND ART

Heretofore there are various known constructions for a speed sensing rolling bearing unit for supporting a wheel of a vehicle on to a suspension unit so as to be freely rotatable, and for sensing the rotational speed of the wheel in order to control an anti-lock braking system (ABS) or a traction control system (TCS).

With all of the rotational speed sensing units incorporated into these speed sensing rolling bearing units, there is provided a tone wheel which rotates together with the wheel, and a sensor which outputs an output signal which changes at a frequency proportional to the rotational speed of the tone wheel.

In U.S. Pat. No. 5,200,697, special consideration to the side of sensor is not taken.

The sensor disclosed in U.S. Pat. No. 5,293,124 has a shortage that the magnetic flux emanating from the north poles is inclined to leak from the core metal to the south pole resulting in inefficient magnetic flux across the coil and inefficient output voltage.

The sensor disclosed in U.S. Pat. No. 5,004,358 has a shortage that the dual structure of radially outer and inner sections causes the structure complicated and enlarged In Japanese Hatsumei Kyokai Technical Report No. 94-16051, there is disclosed a speed sensing rolling bearing unit such as shown in FIG. 1.

With this unit, a flange 2 for attaching a wheel, is formed on an outer peripheral surface of an axially outer end portion (here the term "outer" means the widthwise outer side of the vehicle when fitted to a vehicle; the left side in FIG. 1) of a hub 1 constituting an inside member, and an inner ring raceway 3a and a step 4 are formed on an outer peripheral surface of a central portion. Furthermore, an inner ring 5 formed with an inner ring raceway 3b on an outer peripheral surface thereof and constituting an inside member together with the hub 1, is externally secured to the outer peripheral surface of the hub 1 with an axially outer end face thereof abutted against the step 4. Instead of having the inner ring race way 3a formed directly on the outer peripheral surface of the hub 1, an inner ring (not shown in the figure) separate to the hub 1 may be formed, and this inner ring and the inner ring 5 may be externally secured to the hub 1.

A male threaded portion 6 is formed on a portion near the axially inner end of the hub 1. The inside member is made up by securing the inner ring 5 to a predetermined portion on the outer peripheral surface of the hub 1 by means of a nut 7 which is threaded onto the threaded portion 6 and tightened. Furthermore, an outside member 8 which is located around the hub 1, is provided on a central outer peripheral surface thereof with an attachment portion 9 for securing the outside member 8 to a suspension unit. Moreover, outer ring raceways 10a, 10b are formed on the inner peripheral surface of the outside member 8, facing the respective inner ring raceways 3a, 3b.

Furthermore, a plurality of rolling members 11 are respectively provided between the inner ring raceways 3a, 3b and the outer ring raceways 10a, 10b, so that the inside member can rotate freely inside the outside member 8. With the example of FIG. 1, balls are used for the rolling members 11. However in the case of a rolling bearing unit for heavy vehicles, taper rollers may be used for the rolling members.

A seal ring 12 is fitted between the inner peripheral surface at the axially outer end of the outside member 8 and the outer peripheral surface of the hub 1 to cover the opening at the axially outer end of the space existing between the inner peripheral surface of the outside member 9 and the outer peripheral surface of the hub 1, in which is provided the plurality of rolling members 11.

A base end portion of an encoder 13 (left end portion in FIG. 1) is externally secured to a portion on an axially inner end portion (inner here means the side towards the center of a vehicle when fitted to a vehicle) of the inner ring 5, spaced away from the inner ring raceway 3b. The encoder 13 is formed in an overall annular shape (short cylindrical shape) from a ferromagnetic metal plate such as steel plate. The encoder 13 is made up with a smaller diameter portion 14 and a larger diameter portion 15 formed concentric with each other and connected by a stop portion 16 With the encoder 13, the larger diameter portion 15 is externally fitted to the outer peripheral surface of the end portion of the inner ring 5, and is secured to the inner ring 5 with the stop portion 16 abutted against the end rim portion of the inner ring 5. Consequently, the smaller diameter portion 14 is supported concentric with the inner ring 5. Furthermore, a plurality of apertures 17 constituting rotation side cutout portions, are formed at even spacing around the circumferential direction, so that the magnetic characteristics around the circumferential direction change alternately and at even spacing. The respective apertures 17 are of the same rectangular shape and elongate in the axial direction (the left-right direction in FIG. 1).

An opening portion at the axially inner end of the outside member 8 is covered with a cover 18 made in a bottomed cylindrical shape by deep drawing a metal plate such as stainless steel plate or aluminum plate. An annular sensor 20 is enclosed in an annular synthetic resin portion 21 inside an inner peripheral surface of a cylindrical portion 19 of the cover 18. The sensor 20 comprises a permanent magnet 22, a stator 23 formed from a ferromagnetic material such as steel plate, and a coil 24, and is formed in an overall annular shape by embedding the respective components 22, 23, 24 in the synthetic resin portion 21.

Of the respective constituent members of the sensor 20, the permanent magnet 22 is formed in an overall annular shape (ring shaped) and is magnetized radially. The inner peripheral surface of the permanent magnet 22 faces the outer peripheral surface of the portions not formed with the apertures 17 at the base end portion of the smaller diameter portion 14 of the encoder 13, across a small gap 25.

The stator 23 is formed in an overall annular shape of J-shape in cross section. An inner peripheral surface of an end portion of a radially outer cylindrical portion 26 of the stator 23 and an outer peripheral surface of the permanent magnet 22, are positioned close to or abutted against each other. An inner peripheral surface of a radially inner cylindrical portion 27 of the stator 23 opposes the portion formed with the plurality of apertures 17 at one part of the smaller diameter portion 14 of the encoder 13, across the small gap 25. Moreover, a plurality of cutouts 28 (fixed side cutout portions) are formed in the radially inner cylindrical portion 27 around the circumferential direction at a pitch (central angle pitch) equal to that of the apertures 17. Consequently, the radially inner cylindrical portion 27 is formed in a comb teeth configuration.

The coil 24 is formed in an annular shape by winding a conducting wire onto a bobbin 29 of a non magnetic material, and is located on an inner peripheral portion of the radially outer cylindrical portion 26 of the stator 23. An electromotive force induced in the coil 24 is taken out from a connector 30 which protrudes from an outer surface of the cover 18.

At the time of using the speed sensing rolling bearing unit constructed as described above, when the encoder 13 rotates together with the inner ring 5 which constitutes the inside member, the magnetic flux density in the stator 23 facing the encoder 13 changes, and the voltage induced in the coil 24 thus changes at a frequency proportional to the rotational speed of the hub 1. The reason for the change in the voltage induced in the coil 24 with the change in density of the magnetic flux flowing in the stator 23, is the same as for the case of conventional well known rotational speed sensing sensors. Moreover, the reason for the change in the density of the magnetic flux flowing in the stator 23 with rotation of the encoder 13 is as follows.

With the apertures 17 provided in the encoder 13 and the cut outs 28 provided in the stator 23, since these have the same pitch, then with rotation of the encoder 13, there is an instant where these simultaneously oppose each other around the whole periphery. Furthermore, at the instant when the respective apertures 17 and the respective cutouts 28 oppose each other, then column portions (ferromagnetic bodies) existing between the adjacent apertures 17, and tongue portions (ferromagnetic bodies) existing between the adjacent cutouts 28 oppose each other across the small gap 25. With the column portions and the tongue portions (ferromagnetic bodies) opposing each other in this way, a high density magnetic flux flows between the encoder 13 and the stator 23.

On the other hand, if the phase of the apertures 17 and of the cutouts 28 is displaced by one half, then the density of the magnetic flux flowing between the encoder 13 and the stator 23 drops. That is to say, in this condition, the apertures 17 provided in the encoder 13 oppose the tongue portions, and simultaneously, the cutouts 28 provided in the stator 23 opposes the column portions. With the column portions opposing the cut outs 28, and the tongue portions opposing the apertures 17 in this way, a relatively large air space exists around the whole periphery between the encoder 13 and the stator 23. Hence, in this condition the density of the flux flowing between the two members 13 and 23 drops. The result is that the voltage induced in the coil 24 changes in proportion to the rotational speed of the hub. By using the sensor 20 as described above, then the output voltage induced in the coil 24 changes at a frequency proportional to the rotational speed of the inside member.

With the speed sensing rolling bearing unit constructed and operated as described above, the magnetic flux output from the end face of the permanent magnet 22 of the sensor 20 always flows in the same direction inside the stator 23 of the sensor 20. Only the magnitude of the magnetic flux density changes with rotation of the encoder 13, and a voltage corresponding to this change in the magnetic flux is induced in the coil 24. Therefore it is difficult to increase the amount of change in the voltage (the difference between the maximum and minimum amount). In particular at the time of low speed traveling when the speed at which the magnetic flux density changes is low, the absolute value of the induced voltage, and the amount of change is small.

In view of this situation, there has been proposed a construction where a permanent magnet is provided on the encoder side, with south poles and north poles located on a portion of the permanent magnet facing the sensor, alternately and at even spacing around the circumference. If such an encoder incorporating permanent magnets is used, then the magnetic flux flows in the stator of the sensor alternately in opposite directions. This is referred to as alternating magnetic flux. Consequently voltages can be induced in the coil fitted to the stator, in mutually opposite directions with rotation of the encoder, thus enabling an increase in the sensor output.

Moreover, to increase the output from the sensor, it is effective to increase the diameter of the detected face of the encoder which faces the sensor. Therefore, contrary to the construction shown in the FIG. 1, the encoder is located diametrically outside of the sensor so that the diameter of the inner peripheral surface of the encoder (detected face) is increased. Furthermore, by increasing the diameter of the encoder, the number of poles provided on the encoder can be increased which is also effective in increasing the detection accuracy.

FIG. 2 shows an encoder 31 which satisfies the above requisites, and a magnetizing apparatus 33 for magnetizing a permanent magnet 32 of the encoder 31. The encoder 31 comprises an annular support ring 34 made of metal plate, and a permanent magnet 32 which is supported and secured around the whole periphery of the support ring 34. The support ring 34 comprises a smaller diameter portion 35 for attachment to a rotation ring such as the inner ring 5 (refer to FIG. 1), a larger diameter portion 36 concentric with the smaller diameter portion 35, and a ring shaped step portion 37 connecting between an and rim of the larger diameter portion 36 and an end rim of the smaller diameter portion 35. The permanent magnet 32 is formed in an overall cylindrical shape and is affixed to the inner peripheral surface of the larger diameter portion 36 around the whole periphery. Furthermore, south poles and north poles are located on the inner peripheral surface of the permanent magnet 32 alternately and at even spacing around the circumferential direction.

With the magnetizing apparatus 33 for magnetizing the permanent magnet 32 in order to make the encoder 31, a plurality of magnetizing terminals 39 are located in a cylindrical formation on an end portion (left end portion in FIG. 2) of a ferromagnetic yoke 38, at the same pitch as the pitch of the adjacent south and north poles of the permanent magnet 32, and at even spacing around the circumference. The magnetizing terminals 39 are provided in the same number as the total number of south poles and north poles located on the inner peripheral surface of the permanent magnet 32, protruding radially outward from the outer peripheral surface at the tip end of the yoke 38, with their respective outer peripheral surfaces elongate in the axial direction of the permanent magnet 32 (left to right direction in FIG. 2). Respective coils 40 are wound around the respective magnetizing terminals 39. On switching on power, the respective coils 40 radially magnetize the magnetic body (permanent magnet material, high coercive force material) which is to become the permanent magnet 32 and which faces the outer peripheral surfaces of the respective magnetizing terminals 39.

The portion surrounding the respective magnetizing terminals 39 at the tip end portion of the yoke 38 is covered with a synthetic resin portion 41, and the respective coils 40 are embedded within this synthetic resin portion 41. A location plate 42 made of a metal plate is secured to an end face of the synthetic resin portion 41. At the time of magnetizing the permanent magnet 32 to alternately locate the south poles and the north poles on the inner peripheral surface of the permanent magnet 32, the location plate 42 is abutted against the step portion 37 of the support ring 34. In this condition, the respective magnetizing terminals 39 face the inner peripheral surface of the magnetic body (permanent magnet material, high coercive force material) which constitutes the permanent magnet 32, along the full length of the magnetic body. Then in this condition, power to the respective coils 40 is switched on to magnetize the magnetic body thereby producing a permanent magnet 32 with south poles and north poles formed on the inner peripheral surface alternately and at even spacing.

When using the conventional magnetizing apparatus 33 as shown in FIG. 2 to magnetize the permanent magnet 32 of the encoder 31 having the construction shown in FIG. 2, a distance $L_{32}$ between the end rim of the permanent magnet 32 and the side face of the step portion 37 of the support ring 34 cannot be made sufficiently small. That is to say, in the condition with the outer peripheral surfaces of the respective magnetizing terminals 39 of the magnetizing apparatus 33 and the inner peripheral surface of the magnetic body of the permanent magnet 32 opposing each other, the synthetic resin portion 41 in which a portion of the coils 40 is embedded and the location plate 42 exist between the end face of the yoke 38 and the step portion 37. It is therefore not possible to avoid an increase in the distance L32 by this amount.

If the distance $L_{32}$ is increased, then the axial dimension of the encoder 31 is also increased by this amount, thus making it difficult to miniaturize and lighten a speed sensing rolling bearing unit incorporating the encoder 31.

SUMMARY OF THE INVENTION

An object of the present invention is to provide a magnetizing apparatus for a compact encoder of a rotational speed sensing unit, and a speed sensing rolling bearing unit incorporating a compact encoder in consideration of this situation.

Another object of the present invention is to provide a rotational speed sensing unit in which the stator is improved in size to increase the voltage induced in the coil and the output in the sensor to securely obtain the reliability of the ABS and TCS.

DETAILED DESCRIPTION OF THE INVENTION

Figure 2:
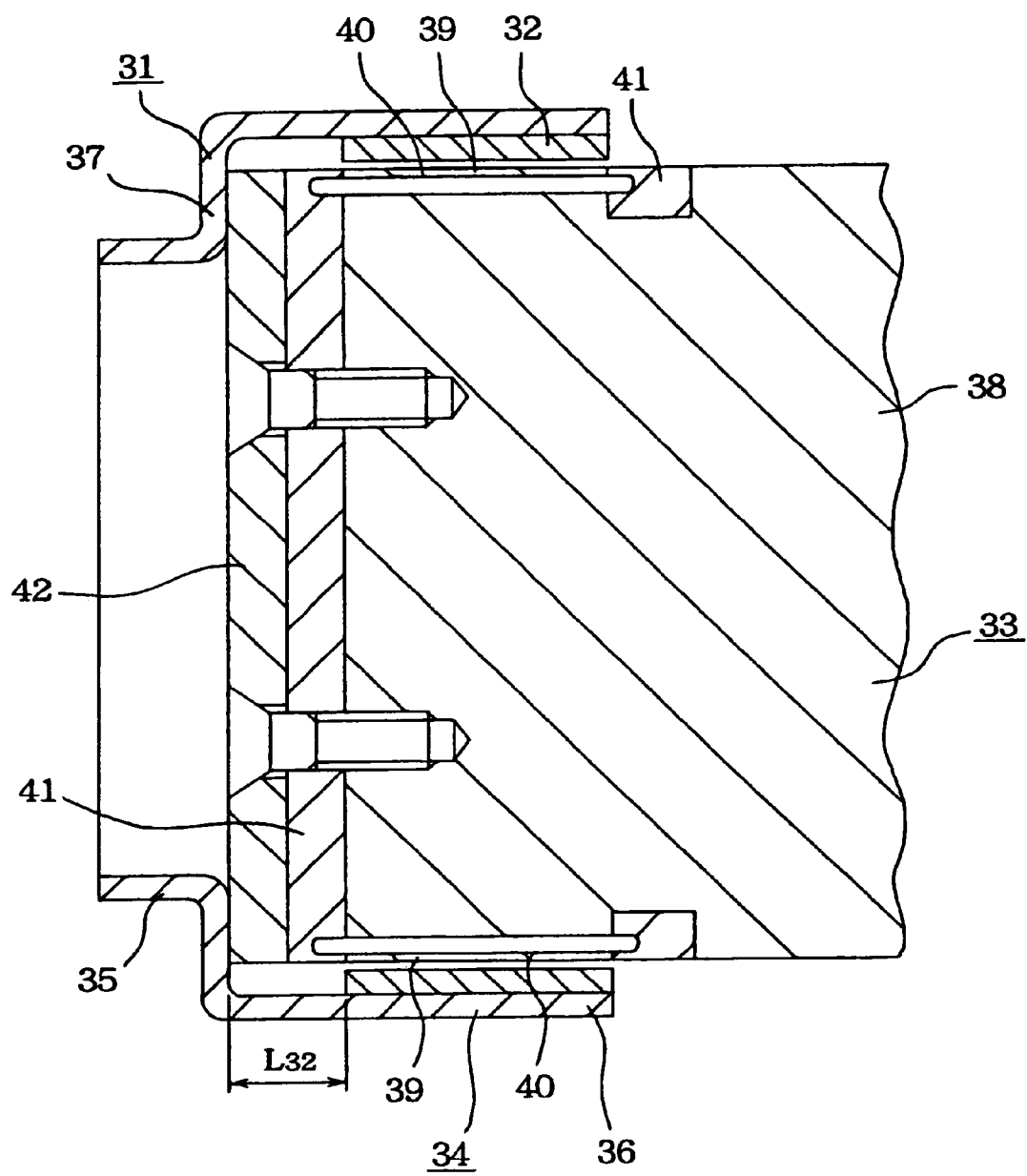
FIG. 2 is a cross-sectional view showing a conventional encoder and magnetizing apparatus.

In the magnetizing apparatus for an encoder of a rotational speed sensing unit according to a first aspect of the invention, as with the conventional construction shown in FIG. 2, (a) the encoder comprises an annular support ring made of metal plate, and a permanent magnet which is supported and secured around the whole periphery of the support ring, the support ring comprising a smaller diameter portion for attachment to a rotation ring, a larger diameter portion concentric with the smaller diameter portion, and a ring shaped step portion connecting between an end rim of the larger diameter portion and an end rim of the smaller diameter portion, the permanent magnet being of cylindrical shape and affixed to the inner peripheral surface of the larger diameter portion around the whole periphery, with south poles and north poles located on the inner peripheral surface alternately and at even spacing around the circumferential direction, and (b) the magnetizing apparatus comprises ferromagnetic magnetizing terminals located in a cylindrical formation at the same pitch as the pitch of the adjacent south and north poles of the permanent magnet, and at even spacing around the circumference with respective outer peripheral surfaces thereof elongate in the axial direction of the permanent magnet, and of the same number as the total number of south poles and north poles located on the inner peripheral surface of the permanent magnet, and respective coils wound around the respective magnetizing terminals, such that on switching on power, the respective coils magnetize a magnetic body (permanent magnetic material, high coercive force material) which is to become the permanent magnet and which faces the outer peripheral surfaces of the respective magnetizing terminals.

In particular, with the magnetizing apparatus for an encoder of a rotational speed sensing unit, according to the present invention, the respective magnetizing terminals have inner and outer peripheral portions such that the width of the inner peripheral portion is narrower than that of the outer peripheral portion. The outer peripheral portion faces the inner peripheral surface of the magnetic body which is to become the permanent magnet, and the coils are wound around this inner peripheral portion.

The speed sensing rolling bearing unit according to a second aspect of the invention comprises an outside member which does not rotate during use, having an outer ring raceway on an inner peripheral surface thereof, an inside member which rotates during use, having an inner ring raceway on an outer peripheral surface thereof, a plurality of rolling members provided so as to be freely rotatable between the outer ring raceway and the inner ring raceway, an encoder externally secured to an end portion of the inside member, and a sensor supported on the outside member and facing the encoder. The encoder comprises an annular support ring made of metal plate, and a permanent magnet which is supported and secured around the whole periphery of the support ring, the support ring comprising a smaller diameter portion for attachment to a rotation ring, a larger diameter portion concentric with the smaller diameter portion, and a ring shaped step portion connecting between an end rim of the larger diameter portion and an end rim of the smaller diameter portion, the permanent magnet being of cylindrical shape and affixed to the inner peripheral surface of the larger diameter portion around the whole periphery, with south poles and north poles located on the inner peripheral surface alternately and at even spacing around the circumferential direction.

In particular, with the speed sensing rolling bearing unit according to the present invention, the permanent magnet is magnetized in a portion extending from a distance of 7 mm or less from the step portion and axially away from the step portion.

With the magnetizing apparatus for an encoder of a rotational speed sensing unit, and a speed sensing rolling bearing unit incorporating an encoder, according to the present invention, constructed as described above, the axial dimension of the encoder is reduced, thus enabling realization of miniaturization and lightening of a speed sensing rolling bearing unit.

Figure 1:
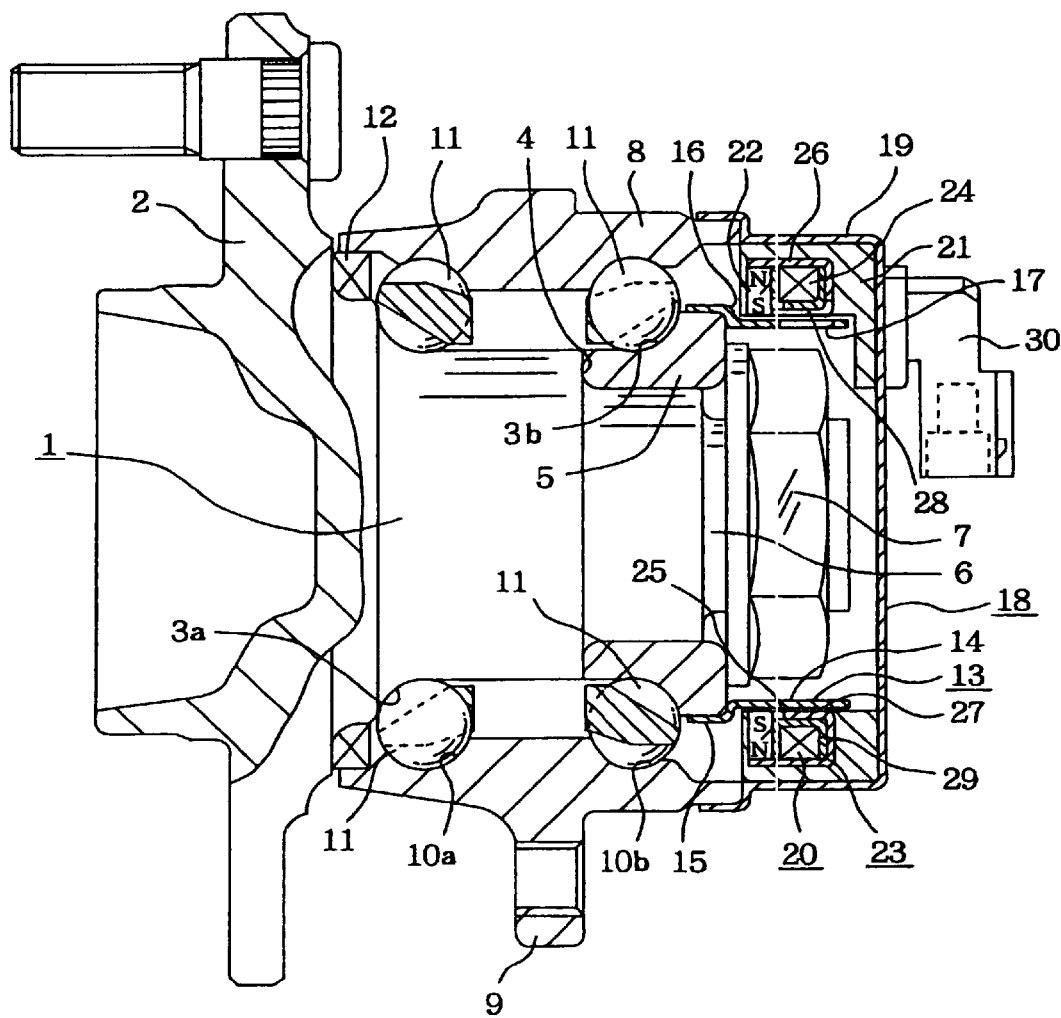
FIG. 1 is a cross-sectional view showing an example of a conventional construction.
Figure 3:
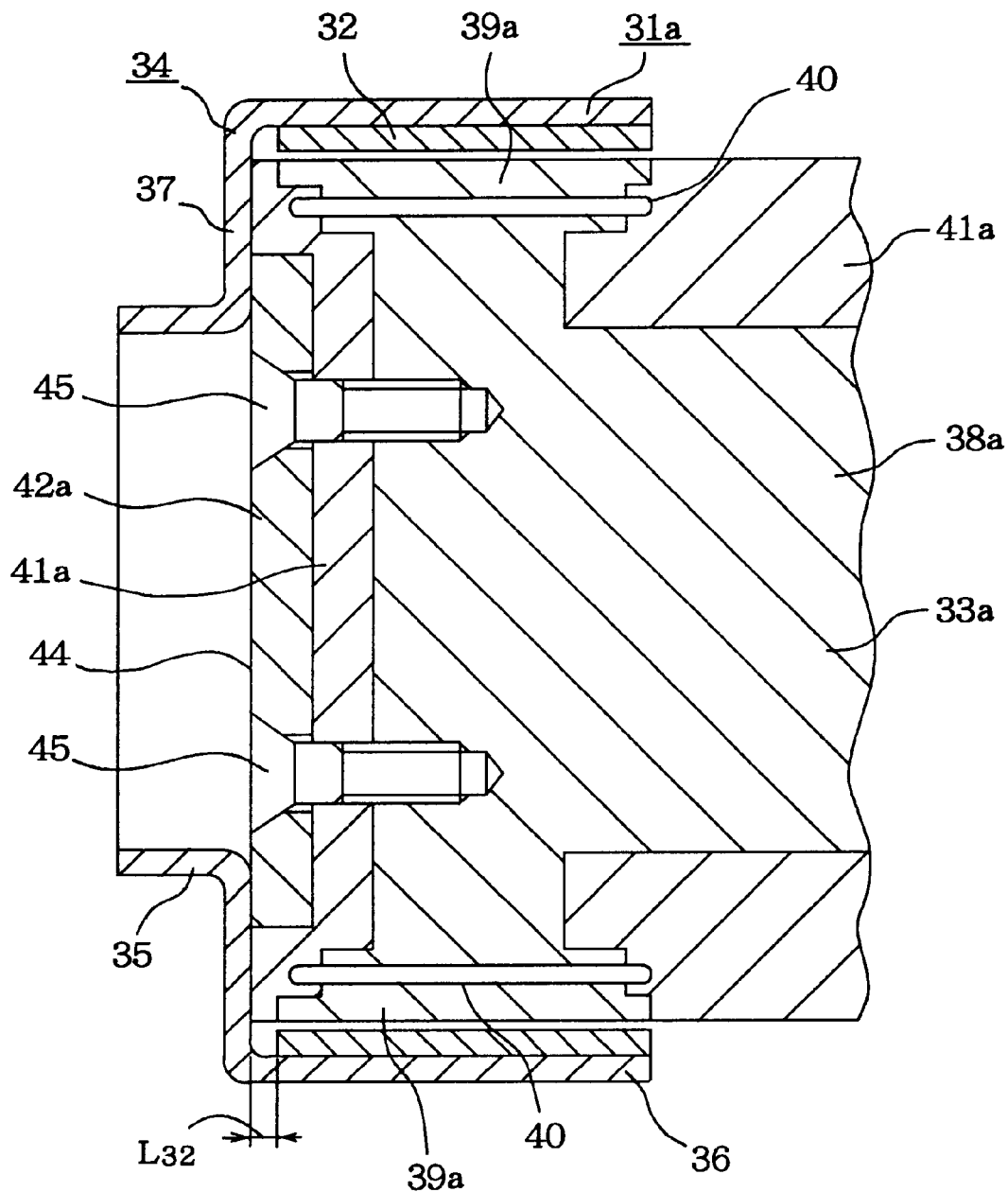
FIG. 3 is a cross-sectional view of a tone wheel and a magnetizing apparatus, illustrating a first embodiment of the present invention.
Figure 4:
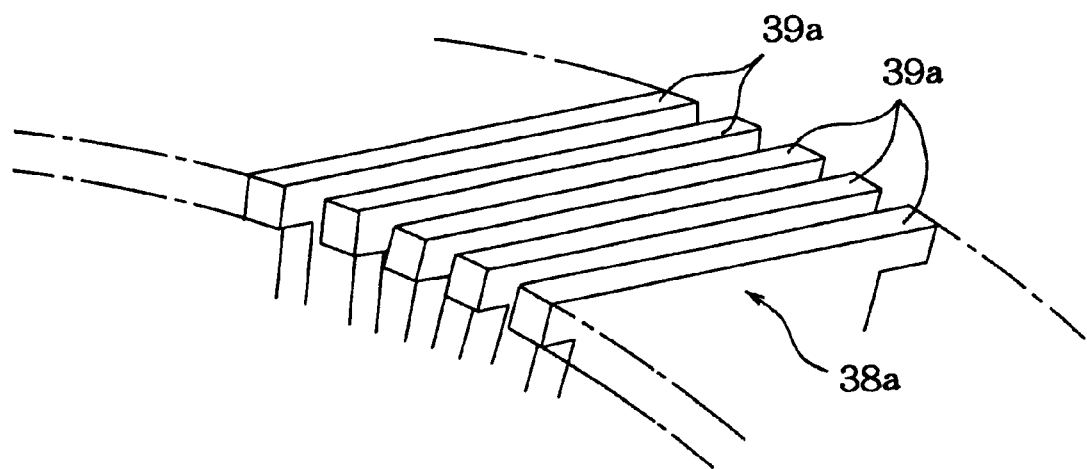
FIG. 4 is a perspective view of an end portion of the magnetizing apparatus, illustrating an arrangement of magnetizing terminals.
Figure 5:
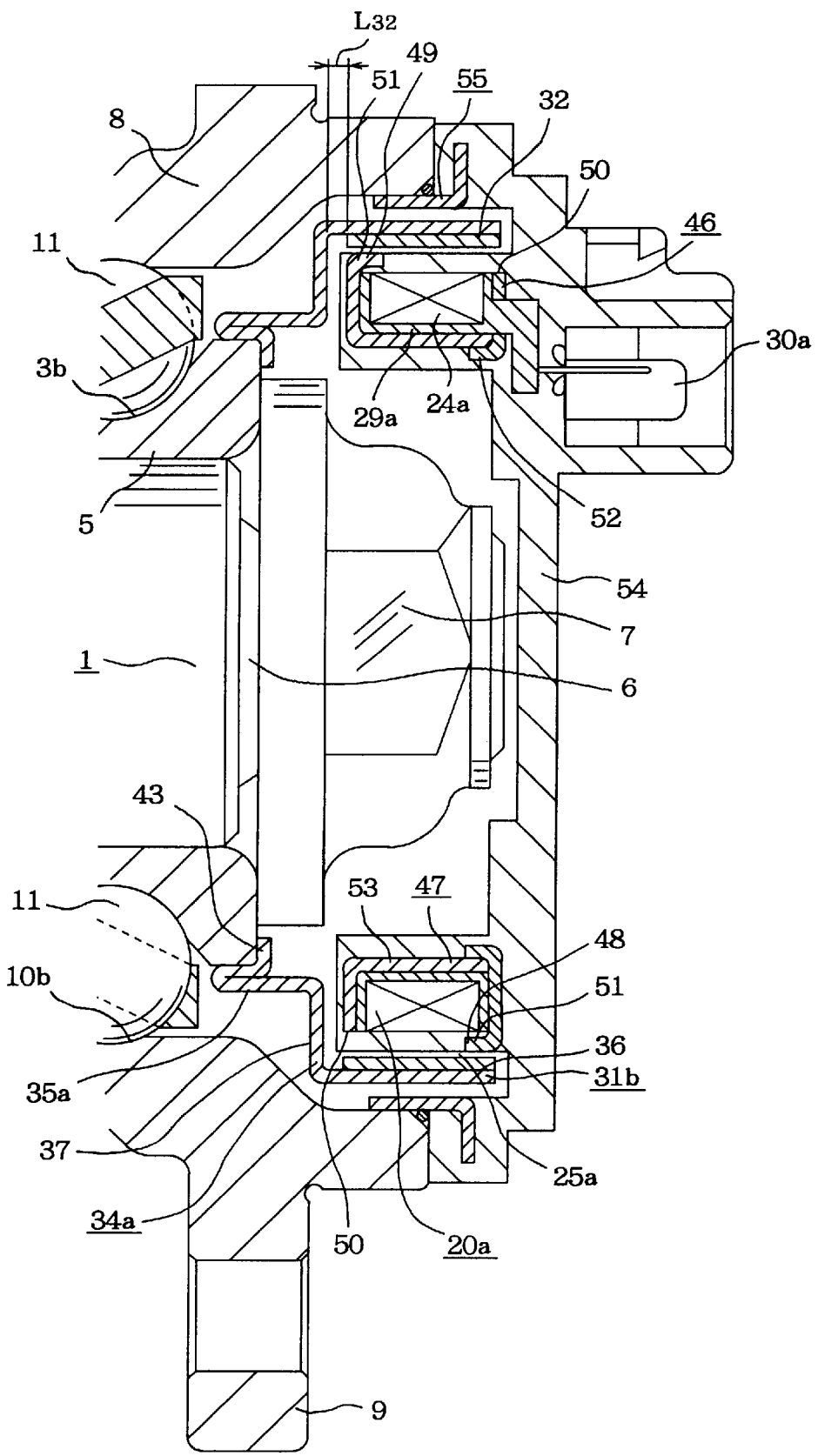
FIG. 5 is an enlarged cross-sectional view of part of a speed sensing rolling bearing unit incorporating a tone wheel which has been magnetized by the magnetizing apparatus.

FIGS. 3 through 5 show an example of an embodiment of the present invention. The characteristic of the magnetizing apparatus for an encoder of a rotational speed sensing unit, and the speed sensing rolling bearing unit incorporating an encoder, according to the present invention, is that miniaturization and lightening of a speed sensing rolling bearing unit is achieved by shortening the axial dimension of encoders 31a, 31b fitted with a permanent magnet 32. The construction and operation of the rolling bearing unit portion is the same as for the conventional construction shown in FIG. 1, and hence figures and description related to the same parts as the conventional construction are omitted for brevity. Hereunder the description is centered on the characteristic parts of the present invention, namely the encoders 31a, 31b and a magnetizing apparatus 33a for magnetizing the permanent magnet 32 of the encoders 31a, 31b, as well as a sensor 20a of a rotational speed sensing unit which is made up by assembly of the encoders 31a, 31b.

The encoders 31a, 31b comprise annular support rings 34, 34a made of metal plate, and the permanent magnet 32 which is supported and secured around the whole periphery of the support rings 34, 34a. The support rings 34, 34a comprise smaller diameter portions 35, 35a for attachment to a rotation ring such as the inner ring 5 (FIG. 5), a larger diameter portion 36 concentric with the smaller diameter portions 35, 35a, and a ring shaped step portion 37 connecting between an end rim of the larger diameter portion 36, and an end rim of the smaller diameter portions 35, 35a.

The permanent magnet 32 is a so-called rubber magnet made with permanent magnetic material powder such as ferrite (high coercive force) contained in a rubber, formed in an overall cylindrical shape. Such a permanent magnet 32 is affixed to the inner peripheral surface of the larger diameter portion 36 around the whole periphery by fusing or bonding or the like. South poles and north poles are located on the inner peripheral surface of the permanent magnet 32 alternately and at even spacing around the circumferential direction.

An inwardly facing flange shape brim portion 43 is formed on a central portion of the inner peripheral surface of the smaller diameter portion 35a of the encoder 31b as shown in FIG. 5, by bending the metal plate. The brim portion 43 abuts against the axially inner end face of the inner ring 5, with the smaller diameter portion 35a externally secured to the outer peripheral surface of the axially inner end portion of the inner ring 5. The encoder 31b is thus located axially with the larger diameter portion 36 and the inner ring 5 concentric.

With the magnetizing apparatus 33a for magnetizing the permanent magnet 32 in order to make the encoders 31a, 31b, a plurality of magnetizing terminals 39a as shown in FIGS. 3 and 4, are located in a cylindrical formation on an end portion (left end portion in FIG. 3) of a ferromagnetic yoke 38a, at the same pitch as the pitch of the adjacent south and north poles of the permanent magnet 32, and at even spacing around the circumference. The magnetizing terminals 39a are provided in the same number as the total number of south poles and north poles located on the inner peripheral surface of the permanent magnet 32, protruding radially outward from the outer peripheral surface at the tip end portion of the yoke 38, with their respective outer peripheral surfaces elongate in the axial direction of the permanent magnet 32 (left to right direction in FIGS. 3 through 5).

Respective coils 40 are wound around the respective magnetizing terminals 39a. On switching on power, the respective coils 40 radially magnetize a magnetic body (permanent magnet material, high coercive force material) which is to become the permanent magnet 32 and which faces the outer peripheral surfaces of the respective magnetizing terminals 39a.

In particular, with the magnetizing terminals 39a of the magnetizing apparatus 33a of the present invention, the width (left and right direction in FIG. 3) of an inner peripheral portion is narrower than that of the outer peripheral portion which faces the inner peripheral surface of the magnetic body to be the permanent magnet 32. Moreover, the respective coils 40 are wound around this narrower width inner peripheral portion. Consequently, the end portions of the respective coils 40 do not protrude toward the tip end side (left side in FIG. 3) from the end face (left end face in FIG. 3) of the magnetizing terminals 39a. As shown in FIG. 4, the outer peripheral portion forms the radially outer edge portion of the magnetizing terminals 39a.

Insulation of the respective coils 40 is achieved by covering the portion surrounding the magnetizing terminals 39a at the end portion of the yoke 38a, and the portion extending from the central portion over the base end portion, with a synthetic resin portion 41a, and embedding the respective coils 40 in the synthetic resin portion 41a. A location plate 42a made from a metal plate or the like, is secured to the central portion of the end face of the synthetic resin portion 41a. That is to say, the synthetic resin portion 41a is formed in a portion corresponding to the and face of the magnetizing apparatus 33a with a circular recess 44. The location plate 42a is then internally fitted into the circular recess 44, and secured to the yoke 38a by means of screws 45. The inner end faces of the synthetic resin 41a and the location plate 42a are located on the same plane as each other. Moreover, the outer diameter of the location plate 42a is made larger than the inner diameter of the step portion 37 of the support rings 34, 34a.

At the time of radially magnetizing the permanent magnet 32 using the magnetizing apparatus 33a constructed as described above to alternately locate the south poles and the north poles on the inner peripheral surface of the permanent magnet 32 around the ciroumferential direction, then as shown in FIG. 3, the portion adjacent to the outer periphery of the inner end face of the location plate 42a is abutted against the step portion 37 of the support rings 34, 34a. In this condition, the respective magnetizing terminals 39a face the inner peripheral surface of the magnetic body (permanent magnet material, high coercive force material) which constitutes the permanent magnet 32, along the full axial length of the magnetic body. Then in this condition, power to the respective coils 40 is switched on to magnetize the magnetic body thereby producing a permanent magnet 32 with south poles and north poles located on the inner peripheral surface alternately and at even spacing around the circumferential direction.

In the case of the magnetizing apparatus 33a of the present invention, as a result of the arrangement for the shape of the respective magnetizing terminals 39a, the end faces of the respective magnetizing terminals 39a can be located at a portion near the tip end face of the magnetizing apparatus 33a. Consequently, with the magnetizing apparatus 33a of the present invention, when magnetizing the permanent magnet 32 of the encoders 31a, 31b having the construction as shown in FIG. 3 and FIG. 5, a distance $L_{32}$ between the end face of the permanent magnet 32 and the side face of the step portion 37 of the support rings 34, 34a can be made sufficiently small.

That is to say, in the condition with the outer peripheral surfaces of the respective magnetizing terminals 39a of the magnetizing apparatus 33a and the inner peripheral surface of the magnetic body of the permanent magnet 32 opposing each other, only a thin portion at the outer peripheral edge portion of the synthetic resin portion 41 in which a portion of the coils 40 is embedded exists between the and face of the outer peripheral portion of the respective magnetizing terminals 39a and the step portion 37. Consequently, the distance $L_{32}$ can be 7 mm or less which was not possible with the magnetizing apparatus 33 (FIG. 2) of the beforementioned conventional construction, and hence the axial dimension of the encoders 31a, 31b can be reduced by this amount, thus enabling miniaturization and lightening of speed sensing rolling bearing units incorporating the respective encoders 31a, 31b.

Next, while not having a direct relationship to the gist of the present embodiment, is a simple description with reference to FIG. 5, of a construction and operation of a sensor 20a of a rotational speed sensing unit incorporating the encoders 31a, 31b such as described above. The sensor 20a is formed in an overall annular shape, with a sensing portion provided on an outer peripheral surface facing an inner peripheral surface of the permanent magnet 32 of the encoder 31b across a small gap 25a. The sensor 20a comprises first and second stators 46, 47 respectively formed in an annular shape, and a coil 24a.

Respective first and second comb tooth rim portions 48, 49 are formed by forming respective cutouts 50 and protrusions 51 in the outer peripheral rim portions of the first and second stators 46, 47 alternately and at even spacing. The pitch (central angle pitch) of the cutouts 50 and the protrusions 51 which make up the respective first and second comb tooth rim portions 48, 49, is made the same as the pitch of the south poles and the north poles (a south pole and a north pole constituting one pitch) located on the inner peripheral surface of the permanent magnet 32. The phase of the first comb tooth rim portion 48 formed on the outer peripheral end portion of the first stator 46, and the phase of the second comb tooth rim portion 49 formed on the outer peripheral end portion of the second stator 47, are displaced by half of the pitch of the cutouts 50 and the protrusions 51.

Consequently, at the instant when all of the protrusions 51 of the first comb tooth rim portion 48 face the south poles provided on the inner peripheral surface of the permanent magnet 32, all of the protrusions 51 of the second comb tooth rim portion 49 face the north poles. Moreover, at the instant when the encoder 31b has rotated half of the pitch of the cutouts 50 and the protrusions 51 from this condition, then all of the protrusions 51 of the first comb tooth rim portion 48 face the north poles provided on the inner peripheral surface of the permanent magnet 32, and all of the protrusions 51 of the second comb tooth rim portion 49 face the south poles.

The inner peripheral end portions of the first and second stators 46, 47 are made magnetically conductive by externally fitting with an interference fit, the tip end portion of a second cylindrical portion 53 formed on the inner peripheral portion of the second stator 47 to a first cylindrical portion 52 formed on the inner peripheral portion of the first stator 46. Consequently an alternating magnetic flux flows in the first and second stators 46, 47 with rotation of the encoder 31b.

Moreover, the coil 24a is formed by winding a conducting wire or lead onto a bobbin 29a having an open outer peripheral side. Recess and land engagement portions are provided between the bobbin 29a and the first and second stators 46, 47, thereby keeping the phase of the first and second stators 46, 47 in the abovementioned condition by means of the bobbin 29a. An alternating voltage corresponding to the abovementioned alternating magnetic flux is induced in the coil 24a with conducting wire wound on the bobbin 29a.

The sensor 20a made up from the first and second stators 46, 47 and the coil 24a, is embedded in a synthetic resin constituting a cover 54 covering the opening portion at the axially inner end of the outside member 8. A sleeve 55 formed from a metal plate in an overall annular shape of L-shape in cross section, is supported on a portion of the cover 54. When covering the opening portion at the axially inner end of the outside member 8, the sleeve 55 is internally secured to the opening portion at the axially inner end of the outside member 8. In this condition, the sensor 20a faces the inner peripheral surface of the permanent magnet 32 of the encoder 31b around the whole periphery across a small gap 25a. A connector 30a is formed integrally with the cover 54 on the inside face of a portion of the cover 54, for taking out the alternating voltage induced in the coil 24a. This alternating voltage is sent to a controller as a signal representing the rotational speed of the hub 1, and is used for controlling an ABS or a TCS.

Due to the above described construction and operation of the present embodiment, the overall length of a speed sensing rolling bearing unit can be shortened, thus enabling miniaturization and lightening of speed sensing rolling bearing units. As a result, installation in a confined space become possible, thus increasing the degree of freedom in designing automobiles.

Figure 6:
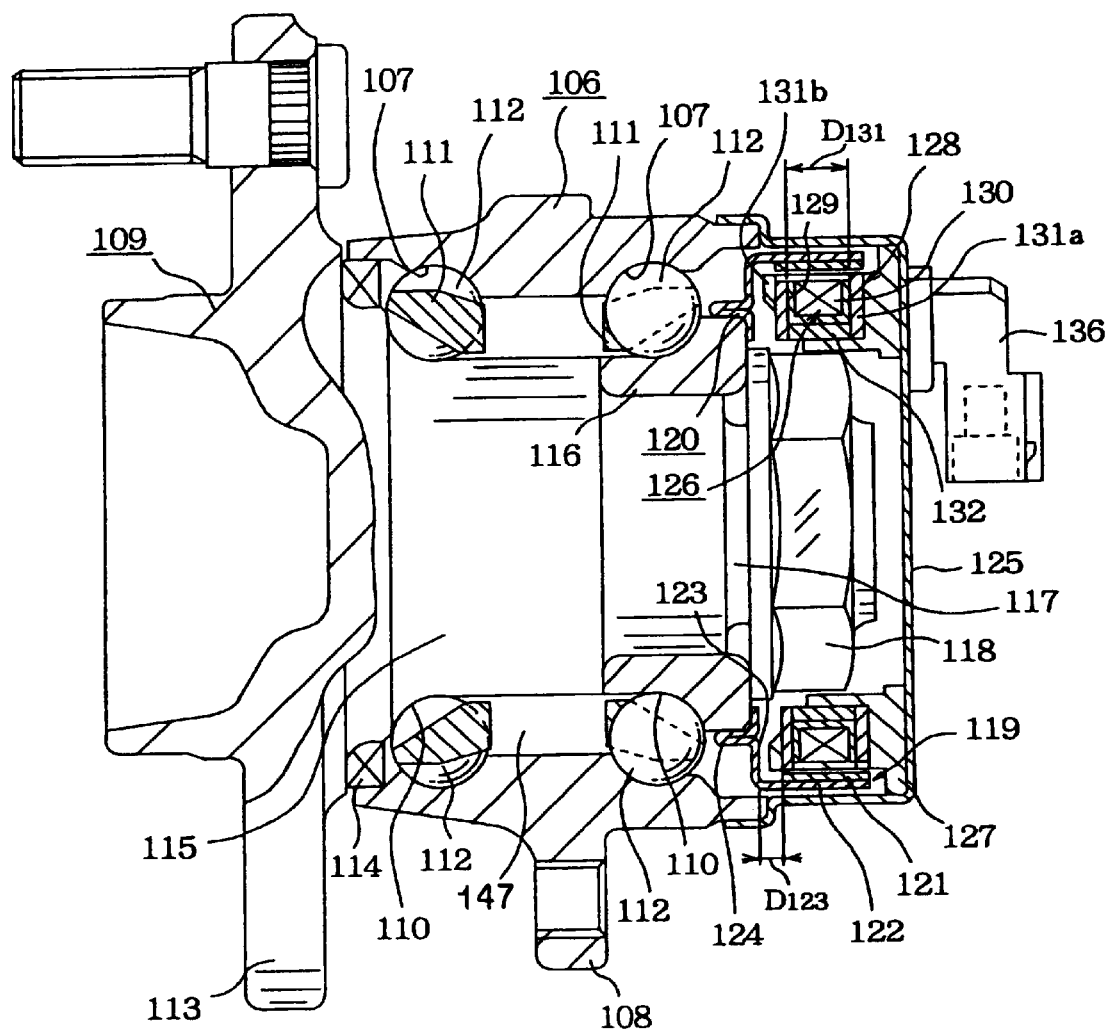
FIG. 6 is a cross sectional view showing an example of the speed sensing rolling bearing unit according to the present invention.
Figure 7:
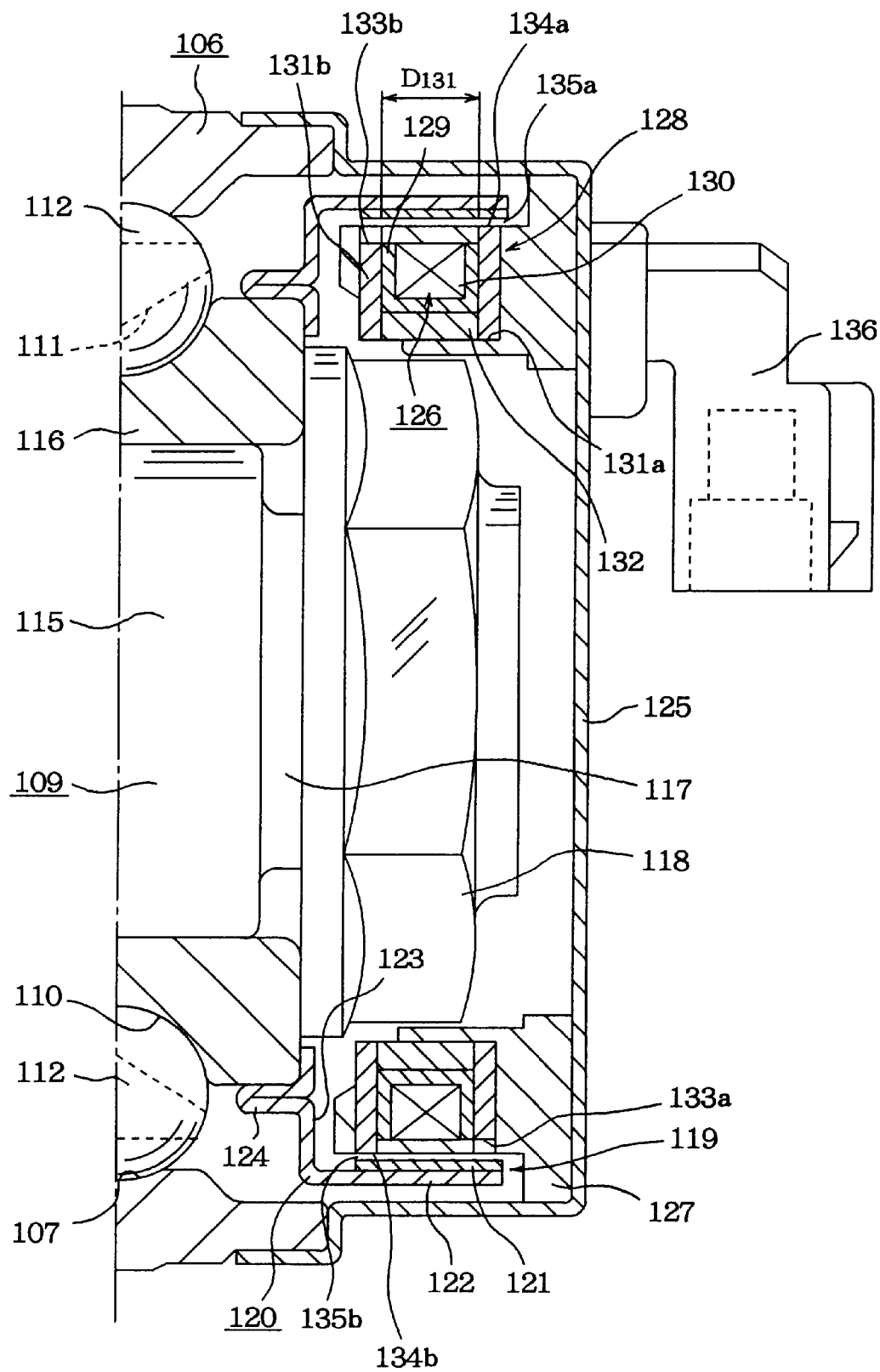
FIG. 7 is an enlarged cross sectional view of the right part of FIG. 6.

FIGS. 6 and 7 show another embodiment of the present invention which is applied to a rolling bearing unit to support a non-driven wheel such as front wheel of FR vehicle, and rear wheel of FF vehicle, There is a stationary ring 106 which has an inner peripheral surface defining a stationary peripheral surface, on which outer ring raceways 107 are formed in two rows each defining a stationary raceway. The stationary ring 106 has a flange 108 on its outer peripheral surface which is supported by a suspension apparatus.

There is a rotatable ring 109 disposed on the inside of the stationary ring 106. The rotatable ring 109 has an outer peripheral surface, that is a rotatable peripheral surface, on which rotatable raceways or inner ring raceways 110 are formed. The inner ring raceways 110 are opposed to the outer ring raceways 107.

A plurality of rolling members 112 are provided between the inner ring raceways 110 and the outer ring raceways 107, and supported by cages 111, so that the rotatable ring 109 is rotatably supported within the stationary ring 106.

In the embodiment shown, balls are used for the rolling members 112, but tapered rollers can be used for the rolling members in the rolling bearing unit for heavy vehicles.

The rotatable ring 109 is formed with a flange 113 on its peripheral surface at an axially outer portion which is projected from the opening of the stationary ring 106, so that a wheel is fixed to the rotatable ring 109 through the flange 113.

A seal ring 114 is mounted to the axially outer and of the rotatable ring 109, which is the outer end in the width direction when installed in the vehicle and the left end in FIG. 6, between the outer peripheral surface of the rotatable ring 109 and the inner peripheral surface of the stationary ring 106, so that the seal ring 114 seals the axially outer opening of the space 137 where the rolling members 112 are placed.

The rotatable ring 109 comprises a hub 115 and an inner ring 116 fitted onto the outer peripheral surface of the hub 115 at its axially inner end portion. The hub 115 is formed with a male thread portion 117 at its axially inner end portion, on which a nut 118 is threaded with the inner ring 116 fitted onto the hub 115, so that the inner ring 116 is secured to the hub 115, thereby forming the rotatable ring 109.

An encoder 119 is fitted on the outer peripheral surface of the axially inner end portion of the rotatable ring 109. The term "axially inner" means the central side in the width direction when installed in the vehicle, the right side in FIG. 6. The encoder 119 is generally annular in shape, and comprised of a cylindrical support ring 120 which is made of a metal plate by way of pressing and a permanent magnet 121 securely supported by part of the support ring 120.

The support ring 120 is comprised of a cylindrical portion 122 and a circular ring portion 123 which is extended radially inward from the axially outer end (left end in FIGS. 6 and 7) of the cylindrical portion 122.

The circular ring portion 123 has a radially mid portion on the axially outer side face (left side face in FIGS. 6 and 7) of which a cylindrical fitting portion 124 is formed by folding 180 degrees part of the metal plate The cylindrical fitting portion 124 is concentric with the cylindrical portion 122, and has an inner diameter which is in the free state slightly smaller than the outer diameter of the axially inner end portion of the inner ring 116. Accordingly, the support ring 120 is secured to the axialy inner end portion of the rotatable ring 109 with the cylindrical fitting portion 124 fitted onto the axially inner end portion of the inner ring 116 through interference fitting. Thus, the cylindrical portion 122 of the support ring 120 is concentric with the rotatable ring 109 in the fixed condition.

A permanent magnet 121 is mounted to the inner peripheral surface of the cylindrical portion 122 in the support ring 120. As Shown FIG. 8, S-poles (south poles) and N-poles (north poles) are arranged with a uniform pitch alternately in a circumferential direction on the inner peripheral surface of the permanent magnet 121. The permanent magnet 121 is secured to the support ring 120 e.g. with adhesive, magnetic suction force, and so on.

The support ring 120 is made of a carbon steal such as SPCC, and the permanent magnet 121 is made of a rubber magnet and fixed to the inner peripheral surface of the cylindrical portion 122 by way of thermal seizure or bonding, whereby the encoder 119 can be easily made with sufficient connecting strength between the support ring 120 and the permanent magnet 121.

Figure 8:
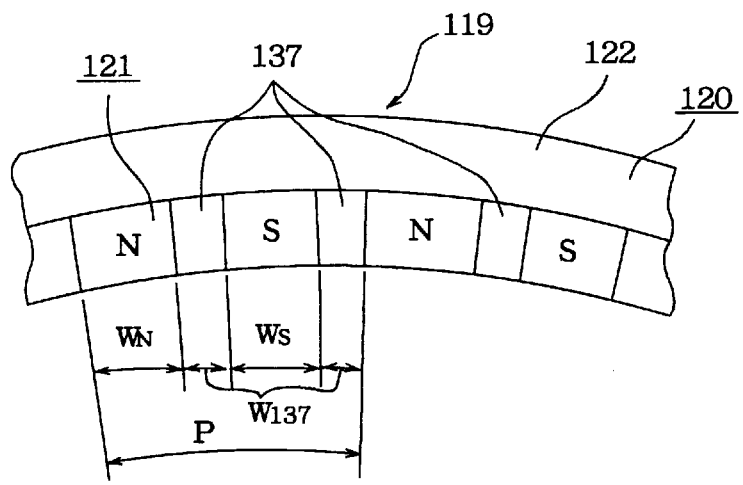
FIG. 8 is a schematic view of part of the encoder in an example.

As shown in FIG. 8, non-magnetized sections 137 are disposed between the S-poles and the N-poles which are arranged in a circumferential direction on part of the permanent magnet 121.

The width size $W_{137}$ of the non-magnetized sections 137 is 0.1 to 0.2 times the pitch P of the S- and N-poles. That is, $W_{137}$=from 0.1 P to 0.2 P.

The S- and N-poles have the same magnetized width, $W_S$ and $W_N$. That is $W_S$=$W_N$. The control of $W_{137}$ equal to 0.1 to 0.2 times the pitch P of the S- and N-poles is provided to increase the amount of magnetic flux flowing through the stator 128 of the sensor 126 detailed later, thereby increasing the output of the sensor 126.

Specifically, by providing the non-magnetized sections 137 between the circumferentially alternately arranged S- and N-poles in the permanent magnet 121, the direct flow between the circumferentially adjacent N- and S-poles can be controlled smaller in amount.

When the width size $W_{137}$ of the non-magnetized sections 137 is smaller than 0.1 times the pitch P of the S- and N-poles, the amount of magnetic flux directly flowing from the N-pole to the S-pole arranged circumferentially adjacent to each other could not be made smaller sufficiently, and therefore it is impossible to sufficiently increase the amount of magnetic flux through the stator 128 and to sufficiently increase the output of sensor 126. On the contrary, the width size $W_{137}$ of the non-magnetized sections 137 is larger than 0.2 times the pitch P of the S- and N-poles, the magnetized sections of the permanent magnet 121 is decreased by that amount, that is the magnetized widths $W_S$, $W_N$ are smaller, then the magnetic flux through the stator 128 is decreased in amount, and the output of the sensor 126 could not be made sufficiently larger.

Figure 9:
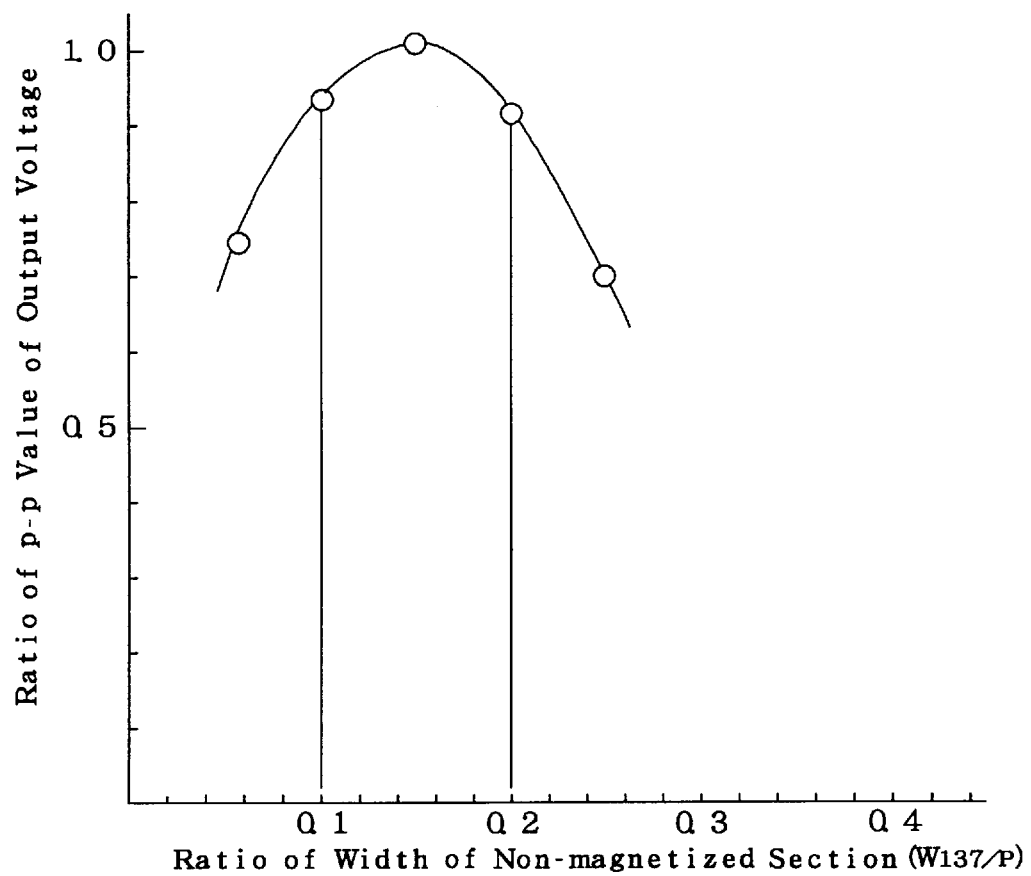
FIG. 9 is a graph showing the relation between the width of the non-magnetized portion and the senior output.

The present inventors measured the effects of the width size $W_{137}$ of the non-magnetized section 137 to the output of the sensor 126 with the width size $W_{137}$ variously changed with reference to the pitch P of the S- and N-poles and obtained the results as shown in FIG. 9, wherein the abscissa indicates the ratio of the width size $W_{137}$ to the pitch P, and the ordinate does the ratio of peak value to peak value (hereinafter, referred to as p-p value) of the output voltage of the sensor 126.

The ratio of p-p value of the output voltage is a relative value which indicates the amount of the difference (p-p value) between the maximum and the minimum of the output value of the sensor 126 which is varied as the encoder 119 rotates, wherein provided that the p-p value in the specimen which has the largest difference in p-p value is 1, the p-p values of the other specimens are shown by the ratio to the largest p-p value.

As shown in FIG. 9, if the ratio of the width size $W_{137}$ to the pitch P, that is $W_{137}/P$, is controlled within the range of 0.1 to 0.2, the ratio of p-p value in the output voltage can be 0.9 or higher.

A bottomed cylindrical cover 125 is provided on the stationary ring 106, specifically the axially outer end portion with the opening of the cover 125 is securely fitted onto the axially inner end portion with opening (right end opening section in FIG. 6) of the stationary ring 106 so as to cover the opening at the axially inner end of the stationary ring 106. The cover 125 is made of a metal plate such as stainless steel or carbon steel by way of plastic working such as deep drawing.

An annular synthetic rising block 127 with the sensor 126 retained in it is securely supported within the cover 125.

The sensor 126 is comprised of a stator 128 made of a ferromagnetic metal plate such as carbon steel and having a channel shape in cross section, and a coil 130 comprising an annular bobbin 129 of non-magnetic material such as the synthetic resin with conductor winding around the bobbin 129.

The stator 128 is a combination of a pair of disc-shaped plates 131a, 131b, each formed with gear tooth shape around the outer periphery thereof, with a cylindrical connector member 132. Specifically, formed around the outer periphery of the disc-shaped plates 131a, 131b are cutouts 133a, 133b which are arranged with a uniform space in a circumferential direction. Circumferentially adjacent cutouts 133a or 133b define a projection therebetween so as to form the land and recess edge sections 134a, 134b in an outer gear tooth shape along the outer periphery of the disc-shaped plates 131a, 131b.

The pitch (central angle pitch) of the cutouts 133a, 133b of the land and recess edge sections 134a, 134b is equal to the pitch of the S- and N-poles on the inner peripheral surface of the permanent magnet 121.

The phase of the land and recess edge section 134a on the outer periphery of the disc-shaped plate 131a is displaced from that of the land and recess edge section 134b on the outer periphery of the disc-shaped plate 131b by an amount equal to half of the pitch of the cutouts 133a, 133b.

Accordingly, at the moment when the projections of the land and recess edge 134a are faced to the S-poles, the projections of the land and recess edge 134b are faced to the N-poles and vice versa.

Both of the axially (left and right directions in FIGS. 6 and 7) end edges of the connecting member 132 are abutted to the radially inward portions of the disc-shaped plates 131a, 131b opposing to each other. Accordingly, the disc-shaped plates 131a, 131b are magnetically connected to each other through the connecting member 132.

In order to control the phase of the land and recess edges 134a, 134b, a land and recess engagement portion can be provided in the abutment portion between the axially opposed end edges of the connecting member 132 and the disc-shaped plates 131a, 131b to control the phase with reference to the circumferential direction of the connecting member 132 and the disc-shaped plates 131a, 131b.

The land and recess edge portion 134a around the disc-shaped plate 131a of the stator 128 is radially opposed to the inner peripheral surface of the permanent magnet 121 of the encoder 119 with a small clearance 135a between them, and the land and recess edge portion 134b around the disc-shaped plate 131b of the stator 128 is radially opposed to the inner peripheral surface of the permanent magnet 121 of the encoder 119 with a small clearance 135b between them.

The coil 130 is placed in a portion which is surrounded by the stator 128 on three sides except for the outer periphery side, and comprised of a bobbin 129 which is made of a synthetic resin and formed in a circular ring shape with a channel shape cross section, where the radially outer side is open, and a conductor winding around the bobbin 129. The coil 130 is nested within the stator 128, specifically surrounded on the three sides by the disc-shaped plates 131a, 131b and the connecting member 132.

Incidentally, the land and recess engagement portion to control the phase of the land and recess edge portion 134a, 134b can be provided between the disc-shaped plates 131a, 131b and the bobbin 129.

The minimum distance between a pair of land and recess edge portion 134a, 134b formed on the stator 128 on the opposite end edge portions of the connecting member 132 is form 3 mm to 9 mm. In the embodiment as shown, the land and recess edge portions 134a, 134b are parallel to each other, and therefore the minimum distance is equal to the distance $D_{131}$ between the pair of disc-shaped plates 131a and 131b.

Accordingly, the distance $D_{131}$ is controlled to be from 3 mm to 9 mm. This results in an increased amount of magnetic flux through the stator 128, and in an increased output of the sensor 126. If the distance $D_{131}$ is less than 3 mm, the amount of the magnetic flux directly flowing between the pair of land and recess edge portions 134a, 134b is larger while the amount of the magnetic flux flowing through the stator 128 across the coil 130 is smaller. On the contrary, if the distance $D_{131}$ is larger than 9 mm, the length of the closed loop for flowing the magnetic flux, including the permanent magnet 121 and the stator 128, is longer. As a result, the leaked magnetic flux from the closed loop to the ambient is larger in amount, and then the amount of the magnetic flux flowing through the stator 128 across the coil 130 is smaller.

Figure 10:
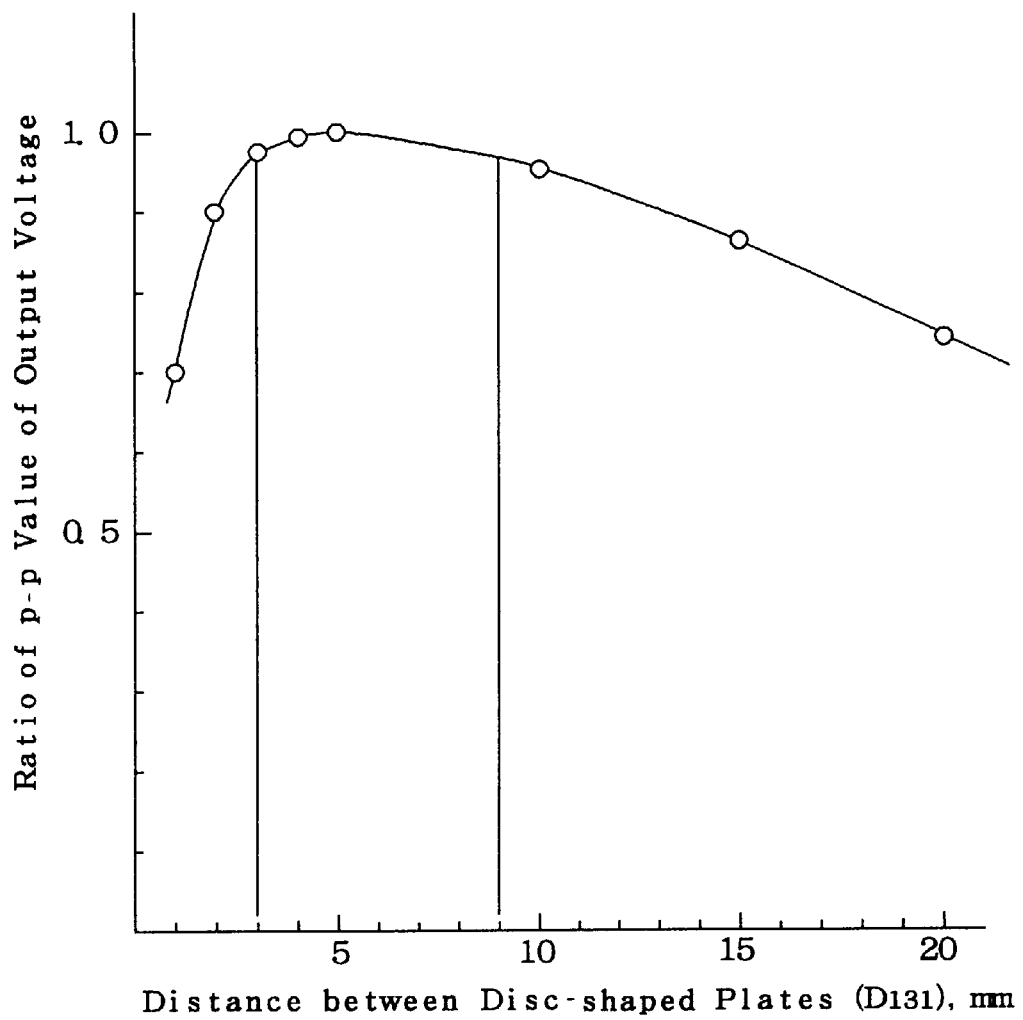
FIG. 10 is a graph showing the relation between the distance between the land and recess edge portions and the sensor output.

The present inventors measured the voltage induced in the coil 130 with distance $D_{131}$ changed and obtained the results as shown in FIG. 10, where the abscissa indicates the distance $D_{131}$ between the pair of disc-shaped plates 131a and 131b, and the ordinate does the ratio in p-p value of the output voltage of the sensor 126. From FIG. 10, it is clear that when the distance $D_{131}$ is controlled within the range of 3 mm to 9 mm, the ratio in p-p value of the output voltage can be 0.95 or higher.

The distance $D_{123}$ in FIG. 6 between the circular ring portion 123 of the support ring 120 of the encoder 119 and the disc-shaped plate 131b opposed to the circular ring portion 123 is desirably limited to the range of 2 mm to 4 mm. This is because, without increasing the size of the speed sensing rolling bearing unit, the amount of the magnetic flux leakage from the disc-shaped plate 131a to the circular ring portion 123 is kept smaller so as to secure the amount of magnetic flux flowing through the stator 128 across the coil 130.

If the distance $D_{123}$ is less than 2 mm, the amount of magnetic flux leakage from the disc-shaped plate 131b to the circular ring portion 123 is increased, while the amount of magnetic flux through the stator 128 across the coil 130 is decreased and the output of the sensor 126 is decreased. On the other hand, if the distance $D_{123}$ is more than 4 mm, the speed sensing rolling bearing unit is enlarged in size while the more output increase in the sensor 126 can not be achieved.

The thickness of the magnetic metal plate of the disc-shaped plates 131a, 131b is desirably from about 1.2 mm to about 2.5 mm. This is to secure the opposing area between the tip face of the projections of the land and recess edge portions 134a, 134b and the inner peripheral surface of the permanent magnet 121, so as to secure the amount of the magnetic flux flowing between the disc-shaped plates 131a, 131b and the permanent magnet 121. If the thickness is less than 1.2 mm in size, the amount of magnetic flux could not be secured, and therefore it is difficult to secure the output of the sensor 126. On the contrary, the thickness is larger than 2.5 mm in size, it is difficult to provide the sensor 126 with a size suitable to be installed in the limited space, and to have the minimum distance $D_{131}$ equal to or larger than 3 mm.

Thus, the sensor 126 is embedded in the synthetic resin block 127 and supported in a nested state in the cover 125. The operation for supporting the sensor 126 with the synthetic resin block 127 in the cover 125 is carried out by injecting a synthetic resin in a cavity of injection mold where the cover 125 and sensor 126 are set.

There is a synthetic resin portion for a connector 136 provided in the cover 125 to take out the voltage induced in the coil 130, that is the output signal of the sensor 126, and this synthetic resin portion is connected to the synthetic resin block 127 containing the sensor 126 embedded therein, through a through-hole formed in part of the cover 125.

As the rotatable ring 109 with a vehicle wheel fixed thereto is rotated in the bearing unit with rotating speed sensor in the present invention, the magnetic poles (S- and N-poles) opposed to the projections of the land and recess edge portions 134a, 134b around the outer peripheries of the pair of disc-shaped plates 131a, 131b are alternately changed in position, specifically reversed in magnetic poles with reference to the projections of the land and recess edge portions 134a, 134b.

Specifically, at one moment, all of the projections of the land and recess edge portion 134a around the outer periphery of the disc-shaped plate 131a are faced to the S-poles, while all of the projections of the land and recess edge portion 134b around the outer periphery of the disc-shaped plate 131b are faced to the N-poles. At this moment, a magnetic flux flows through the stator 128 from the outer periphery of the disc-shaped plate 131b to the outer periphery of the disc-shaped plate 131a.

Then, at the next moment, all of the projections of the land and recess edge portion 134a around the outer periphery of the disc-shaped plate 131a are faced to the N-poles, while all of the projections of the land and recess edge portion 134b around the outer periphery of the disc-shaped plate 131b are faced to the S-poles. At this moment, a magnetic flux flows through the stator 128 from the outer periphery of the disc-shaped plate 131a to the outer periphery of the disc-shaped plate 131b.

Accordingly, alternating magnetic flux flows through the stator 128 as the rotatable ring 109 rotates. Therefore, the magnetic flux is not saturated in the stator 128.

Corresponding to the alternating magnetic flux in the stator 128, electromotive force is induced in the coil 130.

As the direction in which the magnetic flux flows is reversed between the moment when all of the projections of the land and recess edge portion 134a around the disc-shaped plate 131a are faced to the S-poles, and the moment when all of the projections of the land and recess edge portion 134a are faced to the N-poles, electromotive force is produced alternately in opposite directions. Consequently, the difference between the maximum and the minimum in voltage is sufficiently large, thus increasing the precision in detecting the rotating speed.

Figure 11:
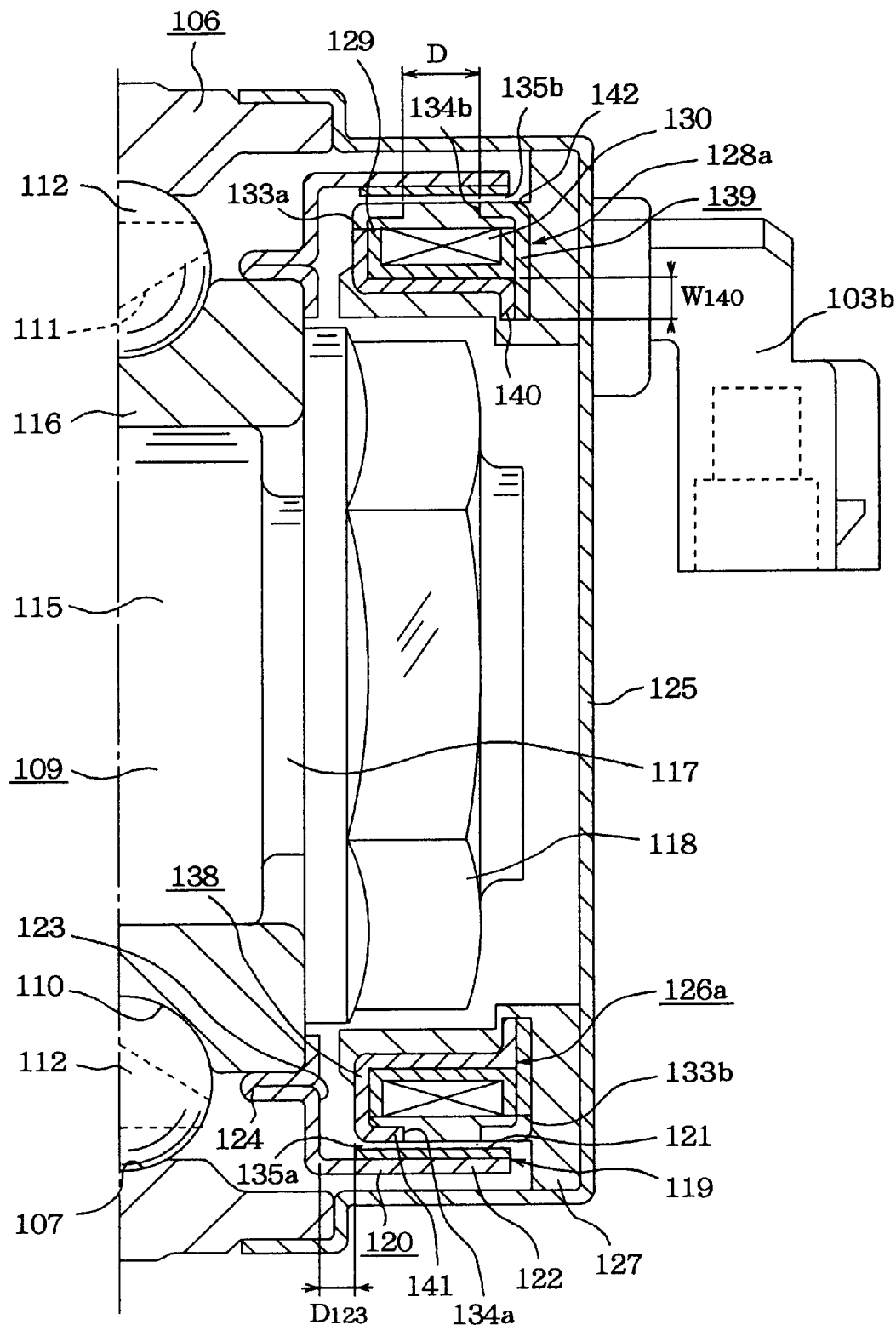
FIG. 11 is a view similar to FIG. 7 showing another example.

In FIG. 11, a second example of the present embodiment is shown, where the structure of the stator 128a of the sensor 126a is different from that of the first example.

In the present example, the stator 128a is constructed by a combination of the first and second stator elements 138, 139 each formed by bending a magnetic metal plate such as SPCC with a thickness of about 1 mm.

The first stator element 138 is provided on the side of the disc-shaped portion 123 of the support ring 120 of the encoder 119 and has a substantially crank shape in cross section, so that a flange portion 140 extends radially inward at the radially inner end and a first cylindrical portion 141 extends axially inwardly (right side in FIG. 11) at the radially outer end.

The second stator element 139 on the side of the cover 125 is formed in a L-shape in cross section, and forms a second cylindrical portion 142 extends axially outwardly (left side in FIG. 11) at the radially outer end.

A plurality of cutouts 133a, 133b are formed in a circumferential direction with a uniform interval around the outer periphery of the first and second stator elements 138, 139. This is similar to the first example. The circumferentially adjacent cutouts 133a (or 133b) define projections between them, so that land and recess edge portions 134a, 134b are formed in an outer gear tooth shape around the outer periphery.

The pitch (center angle pitch) of the cutouts 133a, 133b of the land and recess edge portions 134a, 134b is equal to that of the S- and N-poles provided on the inner peripheral surface of the permanent magnet 121.

The phase of the land and recess edge portion 134a around the outer periphery of the second stator element 139 is displaced by half of the pitch of the cutouts 133a, 133b from the phase of the land and recess edge portion 134b around the outer periphery of the second stator element 139. Accordingly, at the moment when all of the projections of the land and recess edge portion 134a are faced to the S-poles (N-poles), all of the projections of the land and recess edge portion 134b are faced to the N-poles (S-poles).

In the present example, an engagement portion is provided between the first and second stators 138, 139, or between the bobbin 129 of the coil 130 and the first and second stator elements 138, 139 so as to control the circumferential phase and to control the phase of the land and recess edge portions 134a, 134b. The engagement may be formed in a land and recess shape.

The inner peripheral portions of the first and second stators 138, 139 are magnetically connected to each other, by way of abutment between the axially inner face of the flange portion 140 formed on the radially inner end of the first stator element 138 and the axially outer face of the second stator element 139. The width size of the abutment portion, that is the radial width size $W_{140}$ of the flange portion 140 is controlled in the range of 2 mm to 4 mm, so that the magnetic reluctance in the abutment portion between the first and second stators 138, 139 is made small. If the width size $W_{140}$ is less than 2 mm, the magnetic reluctance in the abutment portion is increased, and it is difficult to make the output of the sensor 126a sufficiently large. On the contrary, if the width size $W_{140}$ is larger than 4 mm, not only the effect of further increase in output can not be substantially obtained, but also the radial size of the stator 128a is larger with no effect, resulting in a large size of the speed sensing rotating speed sensor.

In this example, a non-magnetized section is provided between the S-poles and the N-poles which are arranged adjacent to each other in a circumferential direction on the inner peripheral surface of the permanent magnet 121 of the encoder 119, and the non-magnetized section has a width size 0.1 to 0.2 times the pitch of the S- and N-poles, and the minimum distance D between the pair of the land and recess edge portions is from 3 mm to 9 mm.

In this example where the first and second stator elements 138, 139 of the stator 128a are made of a relatively thin (about 1 mm) of magnetic metal plate (SPCC), first and second cylindrical portions 141, 142 are formed on the outer periphery of the stators 138, 139, so that the opposing area is securely obtained between the projections of the land and recess edge portions 134a, 134b and the inner peripheral surface of the permanent magnet 121. Accordingly, the minimum distance D between the pair of the land and recess edge portions 134a, 134b is equal to the distance between the tip ends of the first and second cylindrical portions 141, 142 in this embodiment.

The distance $D_{123}$ between the first stator element 138 and the disc-shape portion 123 of the support ring 120 of the encoder 119 is adjusted in the range of 2 mm to 4 mm due to the same reason as mentioned in the first example.

In this example, due to the land and recess edge portions and the non-magnetized section as mentioned above, the amount of the magnetic flux through the stator 128a can be sufficiently large, so as to increase the electromotive force induced by the coil 130, and therefore the output of the sensor 126a.

Figure 12:
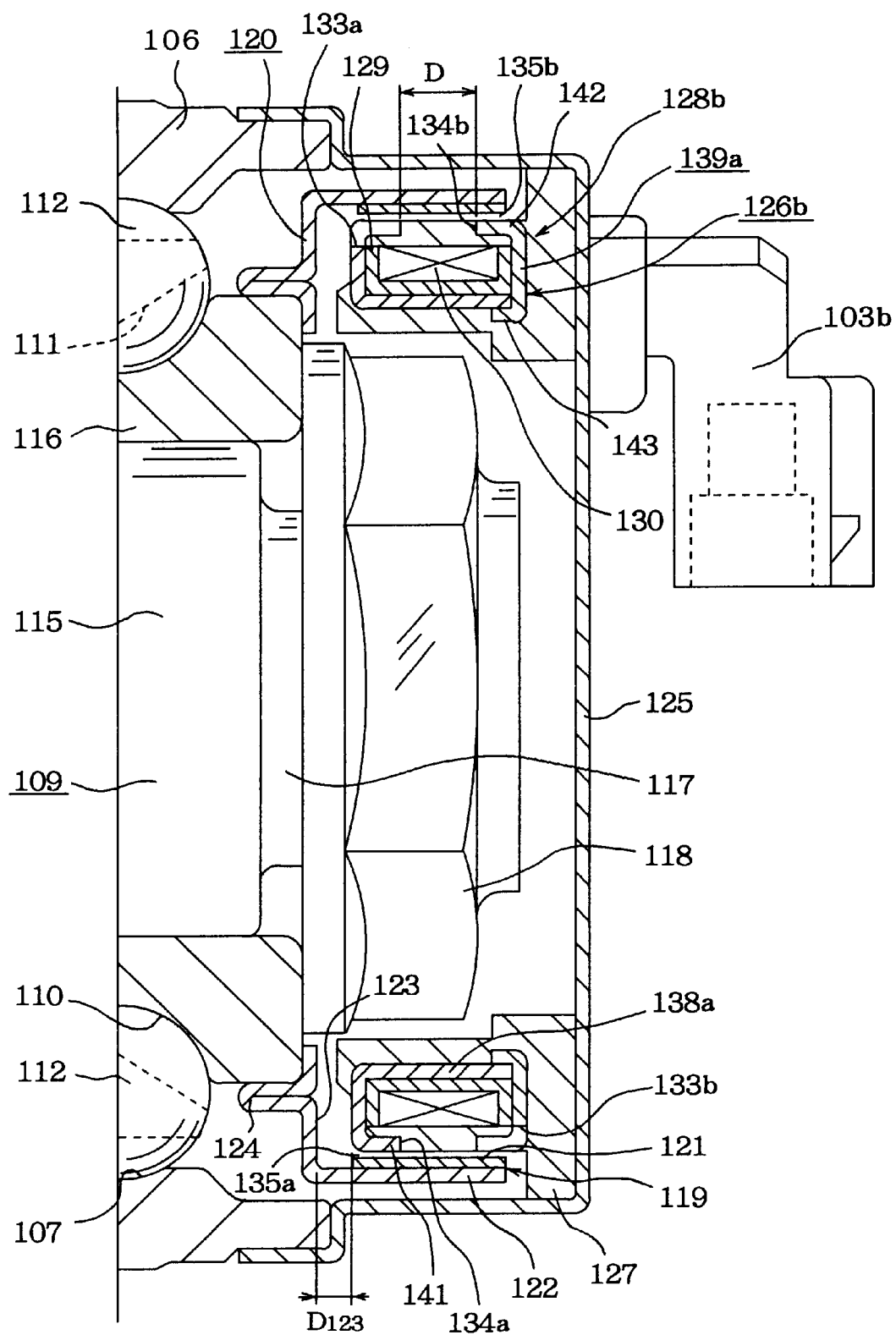
FIG. 12 is a view similar to FIG. 7 showing another example.

FIG. 12 shows a third example of the present embodiment, where the connecting structure between the first and second stator elements 138a, 139a of the stator 128b of the sensor 126b is different from that of the second example.

In this example, the first stator element 138a has a substantially J shape in cross section, and the second stator element 139a has a long channel shape in cross section.

The second stator element 139a has a short cylindrical portion 143 formed in the inner peripheral edge portion, and this short cylindrical portion 143 is fitted into the axially inner end portion of the first stator element 138a so that the contact area between the first and second stator elements 138a, 139a is secured, and that the magnetic reluctance between the first and second stator elements 138a, 139a is made small.

The other constructions and operation are substantially the same as those of second example.

Figure 13:
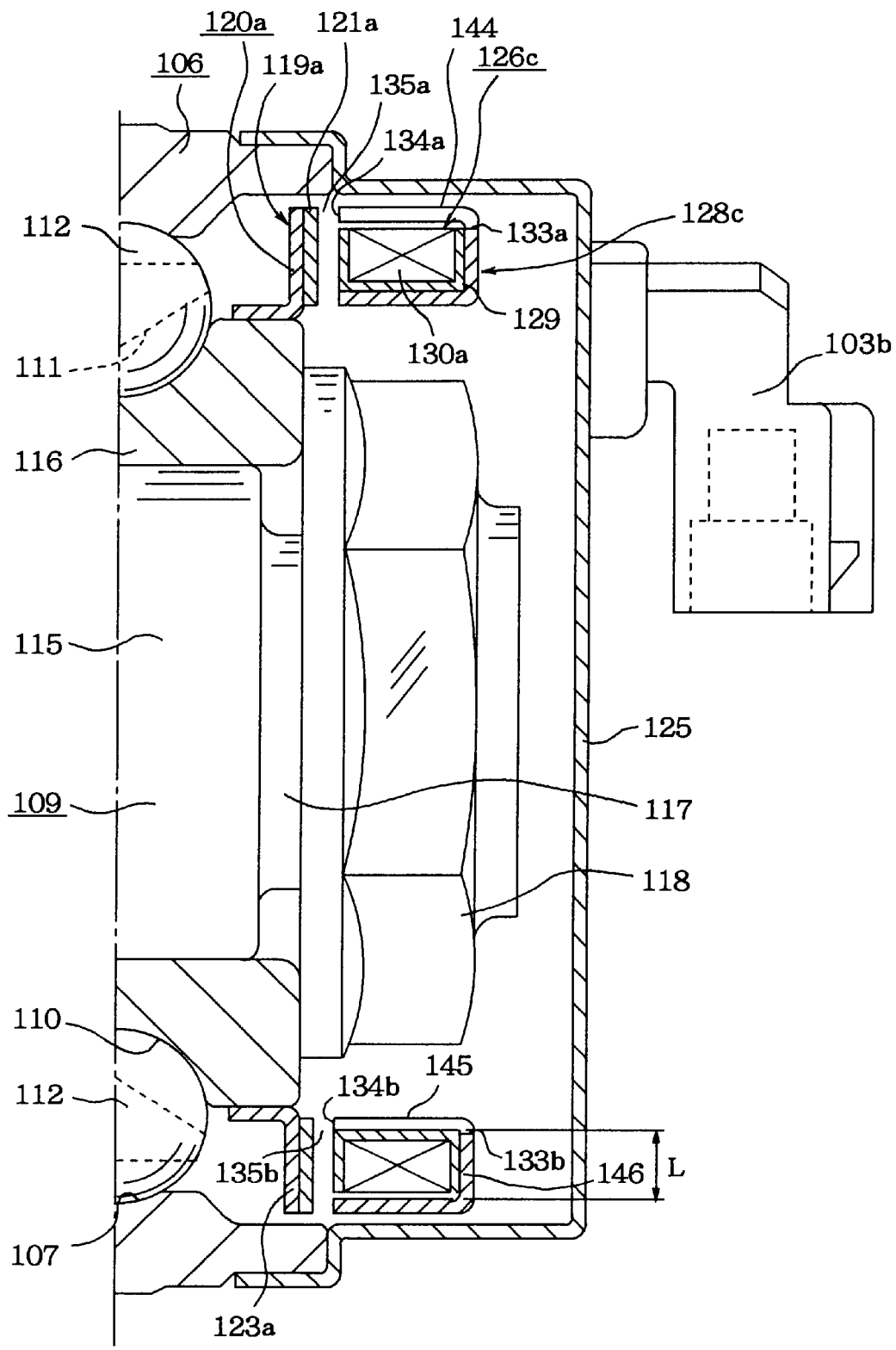
FIG. 13 is a view similar to FIG. 7 showing another example.

FIG. 13 shows a fourth example of the present embodiment, where the permanent magnet 121a of the encoder 119a is opposed to the sensor 126c in a thrust direction.

Accordingly, the support ring 120a of the encoder 119a has a L-shape in cross section, and the permanent magnet 121a is provided adjacent the axially inner face of the disc-shape portion 123a of the support ring 120a.

The sensor 126c embedded in the synthetic resin and supported by the cover 125 is comprised of the stator 128c in a channel shape in cross section opened toward the permanent magnet 121a and the coil 130a supported by the stator 128c.

The stator 128c has a radially outer cylindrical portion 144 and a radially inner cylindrical portion 145, which are arranged concentrically with an annular connecting portion 146 therebetween.

Cutouts 133a, 133b are formed on the tip end edge of the radially outer and inner cylindrical portions 144 and 145, and land and recess edge portions 134a, 134b are provided on the tip end edge portion of the radially outer and inner cylindrical portions 144 and 145.

The shortest distance L between the land and recess edge portions 134a, 134b is equal to half of the distance between the inner diameter of the radially outer cylindrical portion 144 and the outer diameter of the radially inner cylindrical portion 145, and controlled in the range of 3 mm to 9 mm.

The construction parts in the present example are changed corresponding to the change in direction between the permanent magnet 121a of the encoder 119a and the sensor 126c, but the other structures are substantially the same of the preceding examples.

Incidentally, in the examples, the sensor is disposed on the radially inside or on one axial side of the encoder, but the sensor can be disposed on the radially outside of the encoder. This is determined in design for the arrangement of sensor and encoder corresponding to the rolling bearing unit to which the rotating speed sensing device.

Figure 14:
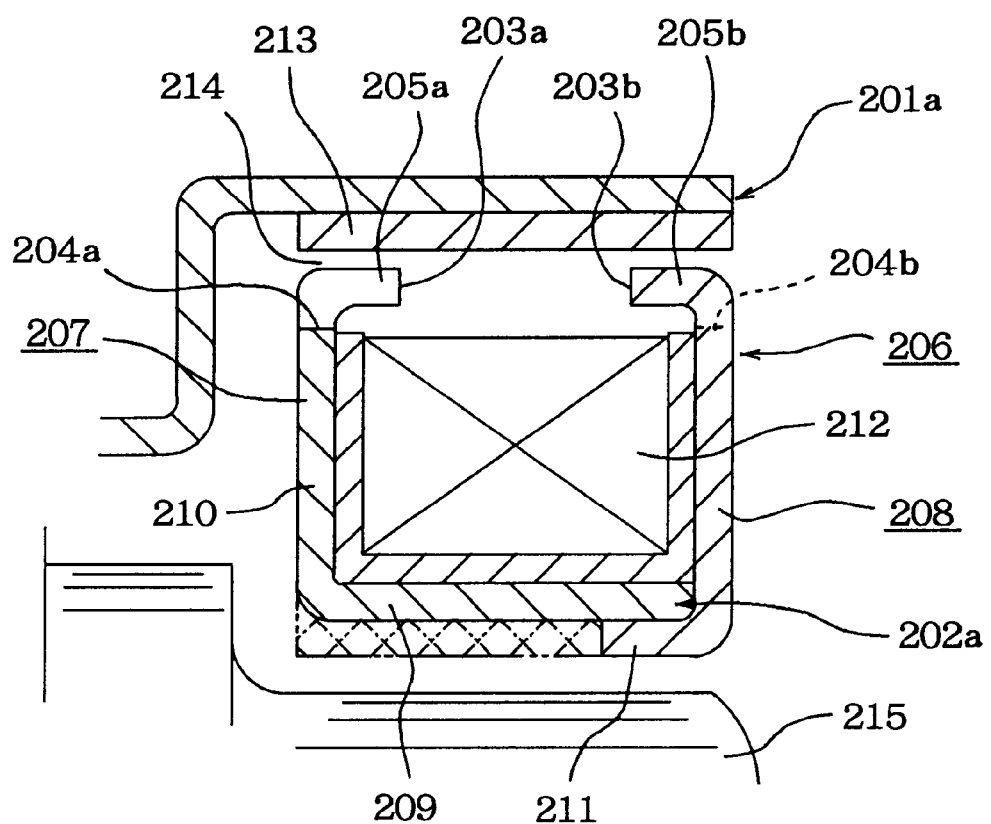
FIG. 14 is a cross sectional view showing a sensor according to the present invention.

FIG. 14 shows another embodiment of the present invention, where the sensor 206 is comprised of first and second stator elements 207, 208 in combination which are made of carbon steel and formed generally in an annular shape by press forming.

The first stator element 207 has a cylindrical portion 209 and a circular ring portion 210 bent radially outward (upward in FIG. 14) at one axially end edge of the cylindrical portion 209, in a L-shape in cross section.

The second stator element 208 is formed with a short cylindrical portion 211 on the inner peripheral edge portion (lower end in FIG. 14). The outer peripheral edge portions (upper edge portions in FIG. 14) of the first and second stator elements 207, 208 are bent at right angles to come closer mutually. The first and second stator elements 207, 208 have an outer peripheral portion containing these bent portions to be formed with the comb tooth shaped edge portions 205a, 205b.

The first stator element 207 and the second stator element 208 are combined with each other by fitting an axial second end of the cylindrical portion 209 of the first stator element 207 onto the short cylindrical portion 211 of the second stator element 208 so as to form the stator 202a. In this combination, a coil 212 is mounted to a portion surrounded on three sides by the stator elements 207, 208. In addition, the phase of the comb tooth shaped edge portions 205a, 205b is displaced by one half of the pitch from the projections 203a, 203b and the cutouts 204a, 204b of the comb tooth edge portions 205a, 205b.

In the speed sensing rolling bearing unit assembled, the sensor 206 is opposed to the inner peripheral surface of the cylindrical permanent magnet 213 of the encoder 201a with a small clearance 214 therebetween. S-poles and N-poles are circumferentially alternately arranged with a uniform pitch on the inner peripheral surface of the permanent magnet 213. Accordingly, as the encoder 201a rotates, an alternating magnetic flux flows through the stator 202a, resulting in an alternating electric current through the coil 212.

In this structure, the cost of the speed sensing roller bearing unit with the stator 202a can be reduced. However, there are some improvements required to realize a compact sensor with large output as follows.

Specifically, in the structure of FIG. 14, the short cylindrical portion 211 of the second stator element 208 projects radially inward than the inner peripheral surface of the cylindrical portion 209 of the first stator element 207. The sensor 206 containing the first stator element 207 and the second stator element 208 is often disposed for example around the nut 215 fixed to part of the rotatable ring.

In the structure of FIG. 14, when the short cylindrical portion 211 is positioned to prevent interference between the sensor 206 and the nut 215 etc., the inner diameters of the cylindrical portion 209 and of the coil 212 around the cylindrical portion 209 are enlarged. As the inner diameter of the coil 212 is enlarged, the cross section of the coil 212 is reduced, and the member of windings of the conductive wire of the coil 212 is reduced, so that it is required to further secure the output of the sensor, that is the voltage induced in the coil 212.

In other words, the inside portions of the cylindrical portion 209, as shown by cross hatching in FIG. 14, must be more efficiently utilized.

Figure 15:
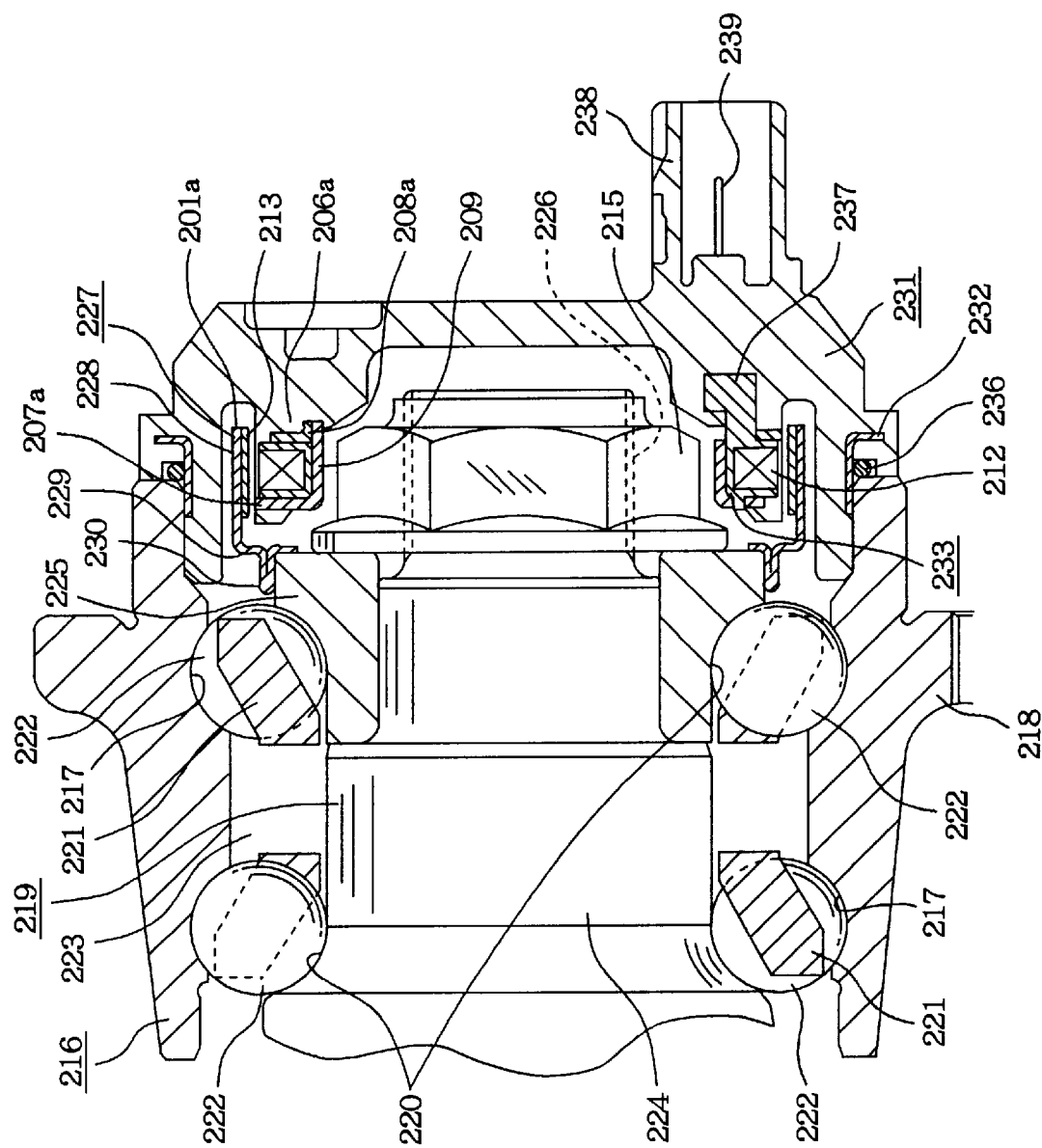
FIG. 15 is a cross sectional view showing another example of the second sensing rolling bearing unit according to the present invention.
Figure 17:
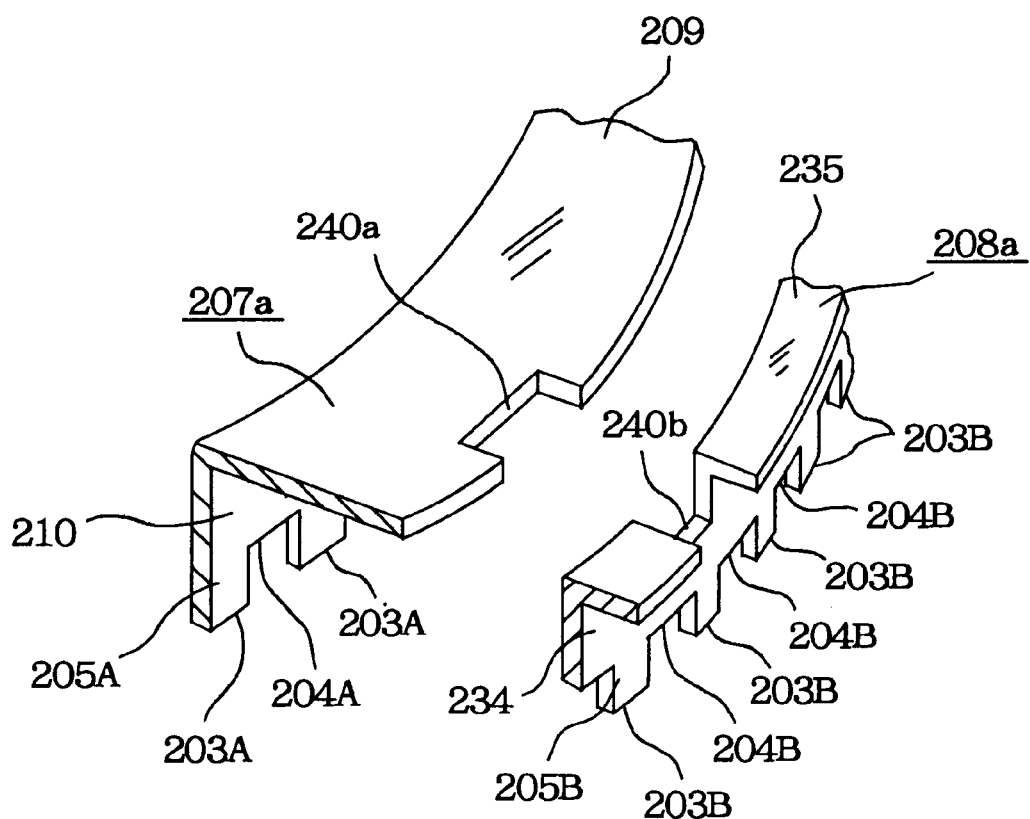
FIG. 17 is an enlarged view showing an example of the stator.

FIGS. 15 and 17 show another embodiment of the present invention which is applied to a rolling bearing unit to support a non-driven wheel such as front wheel of FR vehicle, and rear wheel of FF vehicle.

There is a stationary ring 216 which has an inner peripheral surface defining a stationary peripheral surface, on which outer ring raceways 217 are formed in two rows each defining a stationary raceway. The stationary ring 216 has a flange 218 on its outer peripheral surface which is supported by a suspension apparatus.

There is a rotatable ring 219 disposed on the inside of the stationary ring 216. The rotatable ring 219 has an outer peripheral surface, that is a rotatable peripheral surface, on which rotatable raceways or inner ring raceways 220 are formed. The inner ring raceways 220 are opposed to the outer ring raceways 217.

A plurality of rolling members 222 are provided between the inner ring raceways 220 and the outer ring raceways 217, and supported by cages 221, so that the rotatable ring 219 is rotatably supported within the stationary ring 216.

In the embodiment shown, balls are used for the rolling members 222, but tapered rollers can be used for the rolling members in the rolling bearing unit for heavy vehicles.

The rotatable ring 219 is formed with a flange (not shown) on its peripheral surface at an axially outer portion which is projected from the opening of the stationary ring 216, so that a wheel is fixed to the rotatable ring 219 through the flange.

A seal ring (not shown) is mounted to the axially outer end of the rotatable ring 219 between the outer peripheral surface of the rotatable ring 219 and the inner peripheral surface of the stationary ring 216, so that the seal ring seals the axially outer opening of the space 223 where the rolling members 222 are placed.

The rotatable ring 219 comprises a hub 224 and an inner ring 225 fitted onto the outer peripheral surface of the hub 224 at its axially inner portion. The hub 224 is formed with a male thread portion 226 at its axially inner end portion, on which a nut 215 is threaded with the inner ring 225 fitted onto the hub 224, so that the inner ring 225 is secured to the hub 224, thereby forming the rotatable ring 219.

An encoder 201a is fitted on the outer peripheral surface of the axially inner end portion of the rotatable ring 219. The term "axially inner" means the central side in the width direction when installed in the vehicle, the right side in FIG. 14. The encoder 201a is generally annular in shape, and comprised of a cylindrical support ring 227 which is made of a metal plate by way of pressing and a permanent magnet 213 securely supported by part of the support ring 227.

The support ring 227 is comprised of a cylindrical portion 228 and a circular ring portion 229 which is extended radially inward from the axially outer end (left end in FIGS. 15 and 16) of the cylindrical portion 228.

The circular ring portion 228 has a radially mid portion on the axially outer side face (left side face in FIGS. 15 and 16) of which a cylindrical fitting portion 230 is formed by folding 180 degrees the metal plate.

The cylindrical fitting portion 230 is concentric with the cylindrical portion 228, and has an inner diameter which is in the free state slightly smaller than the outer diameter of the axially inner end portion of the inner ring 225. Accordingly, the support ring 227 is secured to the axially inner end portion of the rotatable ring 219 with the cylindrical fitting portion 230 fitted onto the axially inner end portion of the inner ring 225 through interference fitting. Thus, the cylindrical portion 228 of the support ring 227 is concentric with the rotatable ring 219 in the fixed condition.

A permanent magnet 213 is mounted to the inner peripheral surface of the cylindrical portion 228 in the support ring 227. S-poles (south poles) and N-poles (north poles) are arranged with a uniform pitch alternately in a circumferential direction on the inner peripheral surface of the permanent magnet 213.

The support ring 227 is made of a carbon steel such as SPCC, and the permanent magnet 213 is made of a rubber magnet and fixed to the inner peripheral surface of the cylindrical portion 228 by way of thermal seizure or bonding, whereby the encoder 201a can be easily made with sufficient connecting strength between the support ring 227 and the permanent magnet 213.

The permanent magnet 213 can be a rubber magnet to make the thickness size of the permanent magnet 213 small and to make the inner diameter of the permanent magnet 213 large. If the permanent magnet 213 is a plastic magnet, it Is difficult to make the thickness site small, and then the inner diameter of the permanent magnet 213 is small.

The plastic magnet 213 is made by dispersing powders of ferromagnetic material such as ferrite in synthetic resin, and when the plastic magnet is mounted in the cylindrical portion 228 of the support ring 227 through molding, differences in thermal expansion between the synthetic resin and the carbon steel plate causes to produce a stress in a compression direction in the plastic magnet during temperature increase, and to produce stress in a tension direction during temperature decrease. In order to prevent any failure such as crack in the plastic permanent magnet 213 from being produced, it is necessary that the thickness $T_{213}$ of the permanent magnet 213 in equal to or larger than 0.1 times of the inner radius $R_{228}$ of the cylindrical portion 228 ($T213 \geq R_{228}/10$). However, since the thickness $T_{213}$ of the permanent magnet 213 is large while the inner diameter of the permanent magnet 213 is small, the sensor 206a detailed later is urged to have a small outer diameter and therefore it is difficult to secure sufficiently the output of the sensor 206a.

Since a rubber magnet is produced by dispersing powders of ferromagnetic material in rubber, the permanent magnet made of the rubber magnet can reduce a thickness $T_{213}$ to a sufficiently small one than 0.1 times the inner radius $R_{228}$ of the cylindrical portion 228 ($T_{213} << R_{228}/10$) while the inner diameter of the permanent magnet 213 can be large. Since the rubber magnet has a larger elasticity than the plastic magnet, that is larger tolerance in contraction and expansion, no large stress occurs in the rubber magnet when subjected differences in thermal expansion due to temperature change.

Therefore, sufficiently long endurance is secured with the small inner diameter $R_{228}$.

For example, in the rolling bearing unit with rotating speed sensor generally for use in automobiles, the thickness $T_{213}$ of the permanent magnet can be provided in the range from 0.5 mm to 1 mm. Consequently, the outer diameter of the sensor 206a detailed later can be large, and It is easy to secure the output of the sensor 206a.

Disposed on the axially inner end with opening (right end opening in FIG. 15) of the stationary ring 216 is a bottomed cylindrical cover 231 which is made from synthetic resin through injection molding with its axially outer end with opening fitted into the axially inner end with opening of the stationary ring 216, so that the axially inner end opening of the stationary ring 216 is closed.

Embedded in the axially outer end with opening of the cover 231 is a sleeve 232 which is made of stainless steel etc. and formed in a generally annular shape with L-shaped cross section. The sleeve 232 is fitted into the axially inner end with opening of the stationary ring 216 with interference fitting. Disposed on the fitting portion between the stationary ring 216 and the cover 231 is an O-ring 236 to provide the fitting portion with water-tight sealing.

An annular sensor 206a is embedded in the synthetic resin block of the cover 231.

The sensor 206a is comprised of first and second stator elements 207a, 208a and a coil 212. The first and second stator elements 207a, 208a are made of magnetic material such as carbon steel in an annular shape and provided in series with reference to the direction of magnetic flux flow.

The conductive wire of the coil 212 is wound around a bobbin 233 which is made of non-magnetic material such as synthetic resin and in a generally annular shape with a channel shape cross section with the radially outer side open.

The both ends of the conductive wire are taken out of the bobbin 233 through a take-out portion 237 which is integrally formed with the bobbin 233 on part of its inner side surface, and then connected to the terminals 239 of the connector 238 which is integrally formed on the cover 231.

The first stator element 207a is made of the magnetic metal plate by press-forming to form a L-shaped cross section so as to comprise a cylindrical portion 209 and a circular ring portion 210 bent from the axially outer end edge (left end edge in FIGS. 15 to 20) of the cylindrical portion 209.

The axial length $L_{209}$ of the cylindrical portion 209 is less than 0.25 times the inner diameter $D_{209}$ of the cylindrical portion 209 ($L_{209} \leq D_{209}/4$).

This is because burring process, a less expensive process in pressing, is applied to form the first stator element 207a.

If the requirement of $L_{209} \leq D_{209}/4$ is satisfied, the burring process with a short process time or cycle can be conducted to form the first stator element 207a with no failure such as crack produced therein.

If the axial length $L_{209}$ of the cylindrical portion 209 is longer than 0.25 times the inner diameter $D_{209}$ ($L_{209} > D_{209}/4$) deep drawing process with a long process cycle is required to prevent failures from occurring.

Accordingly, it is desirable for lower cost that the axial length $L_{209}$ of the cylindrical portion 209 is up to 0.25 times the inner diameter $D_{209}$ of the cylindrical portion 209.

The second stator element 208a is formed by pressing the magnetic metal plate to comprise a circular ring portion 234 and a short cylindrical portion 235 bent at right angles inwardly (right in FIGS. 15 to 18) from the inner peripheral edge portion of the circular ring portion 234, having a L-shape in cross section.

The short cylindrical portion 235 is fitted onto the axially inner end of the cylindrical portion 209 of the first stator element 207a with an interference fit or clearance fit, so that the first and second stator elements 207a, 208a are combined in a magnetically connected relation.

Part of the cylindrical portion 209 of the first stator element 207a and part of the second stator element 208a are formed with cutouts 240a, 240b, respectively.

The cutouts 240a, 240b have a role to prevent interference with the take-out portion 237 formed on the inner side surface of the bobbin 233.

The cutouts 240a, 240b are aligned to each other in the combination of the first and second stator elements 207a, 208a.

The circular ring portion 210 of the first stator element 207a and the circular ring portion 234 of the second stator element 208a are formed with combtooth-shaped edge portions 205A, 205B at the radially outer edge portions, such that projections 203A, 204B and cutouts 204A, 204B are alternately arranged in the circumferential direction.

The pitch of the projections 203A, 203B and cutouts 204A, 204B of the combtooth-shaped edge portions 205A, 205B is equal to the pitch (central angle pitch) of the S- and N-poles of the permanent magnet 213 of the encoder 201a.

The combtooth-shaped edge portions 205A, 205B are opposed to the permanent magnet 213 of the encoder 201a with a radial small clearance 214 between them.

Because of the combtooth-ahaped edge portion 205A on the radially outer edge portion of the first stator element 207a and the combtooth-shaped edge portion 205B on the radially outer edge portion of the second stator element 208a, the phase of the cutouts 204A, 204B are displaced from that of the projections 203A, 203B by half of the pitch of the S- and N-poles of the encoder 201a.

Accordingly, at the moment when the S- or N-poles are faced to the projections 203A of the combtooth-shaped edge portion 205A on the first stator element 207a, the N- or S-poles are faced to the projections 203B of the combtooth-shaped edge portion 205B in the outer peripheral edge portion of the second stator element 208a.

In the examples in shown have, land and recess engagement portions are formed between the first and second stator elements 207a, 208a and the bobbin 233, so as to control the phase of the combtooth-shaped edge portions 205A, 205B on the radially outer edge portions of the first and second stator elements 207a, 208a. Specifically, with the engagement of the take-out portion 237 with the cutouts 240b, the phase of the bobbin 233 with the second stator element 208a is controlled. In addition, with the engagement between the hole 241 pierced on the circular ring portion 210 of the first stator element 207*a* and the projection 242 formed on the outer side surface of the bobbin 233, the phase of the bobbin 233 with the first stator element 207*a* is controlled.

The sensor 206*a* is embedded in the synthetic resin block of the cover 231, and fixedly supported in the interior of the axially inner end portion with opening of the stationary ring 216 in a concentric relation with the stationary ring 216.

The operation where the sensor 206*a* is embedded in the synthetic resin block of the cover 231 for supporting is conducted by injection-molding in the injection mold cavity in which the sensor 206*a* is set.

In the rolling bearing unit with rotating speed sensor in the present embodiment, as the rotatable ring 219 with the wheel fixed to it rotates, the magnetic poles (S- and N-poles), faced to the projections 203A, 203B of the combtoothed-shaped edge portions 205A, 205B on the radially outer edge portions of the first and second stator elements 207*a*, 208*a* in the opposite sides of the stator, are alternately changed. In addition, the mutually opposite magnetic poles are faced to the projections 203A, 203B of the combtooth-shaped edge portions 205A, 205B.

Specifically, at a moment, all of the projections 203A of the combtooth-shaped edge portion 205A in the radially outer edge portion of the first stator element 207*a* are opposed to the S-poles, while all of the projections 203B of the combtooth-shaped edge portion 205B in the radially outer edge portion of the second stator element 208*a* are opposed to the N-poles. At this moment, the magnetic flux flows in the first and second stator elements 207*a*, 208*a* from the radially outer edge portion of the second stator element 208*a* to the radially outer edge portion of the first stator element 207*a*.

At the next moment, all of the projections 203A of the comb-shaped end edge portion 205A in the radially outer edge portion of the first stator element 207*a* are opposed to the N-poles, while all of the projections 203B of the combtooth-shaped edge portion 205B in the radially outer edge portion of the second stator element 208*a* are opposed to the S-poles. At this moment, the magnetic flux flows in the first and second stator elements 207*a*, 208*a* from the radially outer edge portion of the first stator element 207*a* to the radially outer edge portion of the second stator element 208*a*.

Accordingly, an alternating magnetic flux flows on the first and second stator elements 207*a*, 208*a* as the rotating ring 219 rotates, so that a large change in magnetic flux is obtained with a small flow of magnetic flux, and the magnetic flux is hardly saturated in the first and second stator elements 207*a*, 208*a*.

An electro motive force is induced in the coils 212 corresponding to the alternating magnetic flux in the first and second stator elements 207*a*, 208*a*, specifically alternately in opposite directions, corresponding to the opposite directions of the magnetic flux flow, for example, from the moment when all of the projections 203A of the combtooth-shaped edge portion 205A on the radially outer edge portion of the first stator element 207*a* are opposed to the S-poles, to the moment when all of the projections 203A of the combtooth-shaped edge portions 205A are opposed to the N-poles. Accordingly the difference between the maximum value and the minimum value of the voltage is sufficiently large to improve the projection in the detection of the rotating speed.

The rolling bearing unit with rotating speed sensor in this embodiment can be produced with an inexpensive cost by press-forming a magnetic metal plate such as carbon steel to form the first and second stator elements 207*a*, 208*a* of the stator of the sensor 206*a*.

Different from the example in FIG. 14, in the present embodiment, the stator has no portion projecting radially inward from the inner peripheral surface of the cylindrical portion 209 of the first stator 207*a*. In other words, the inner peripheral surface is formed in a simple cylindrical shape. Accordingly, the inner diameters of the cylindrical portion 209 and of the bobbin 233 of the coil 212 provided around the cylindrical portion 209 can be smaller. Consequently, the cross section of the coil 212 can be made as large as possible in the limited shape, thus realizing a compact rolling bearing unit with rotating speed sensor with high-performance.

The structure of this embodiment can be enlarged in the axial size than the structure in FIG. 14 by the amount of the axial length of the short cylindrical portion 235. However, in the axial direction, there is a margin in the space compared with the radial direction, and this causes substantially no limitation in design in the rolling bearing unit with rotating speed sensor.

Figure 16:
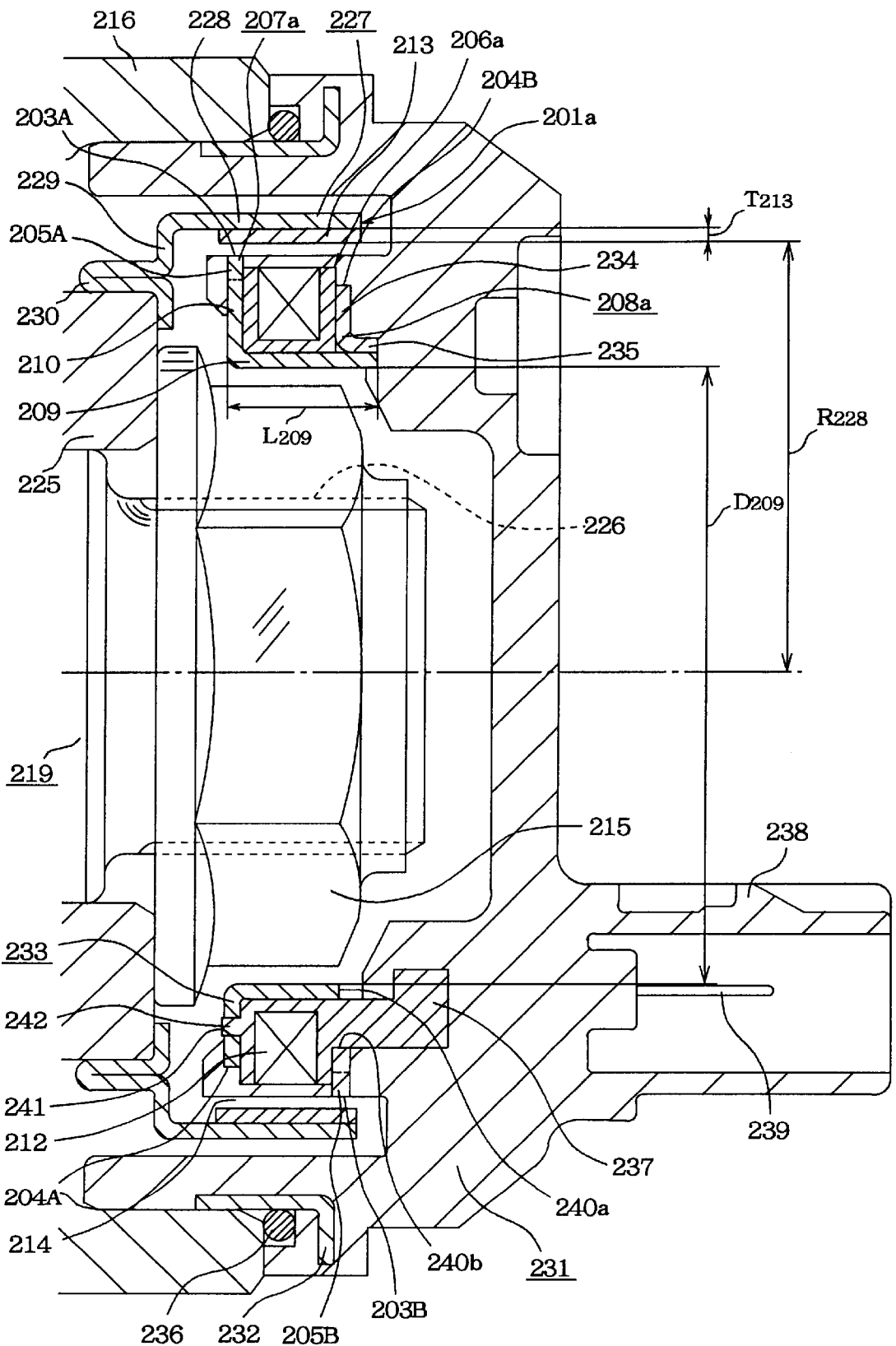
FIG. 16 is an enlarged view showing the right part of FIG. 15.
Figure 18:
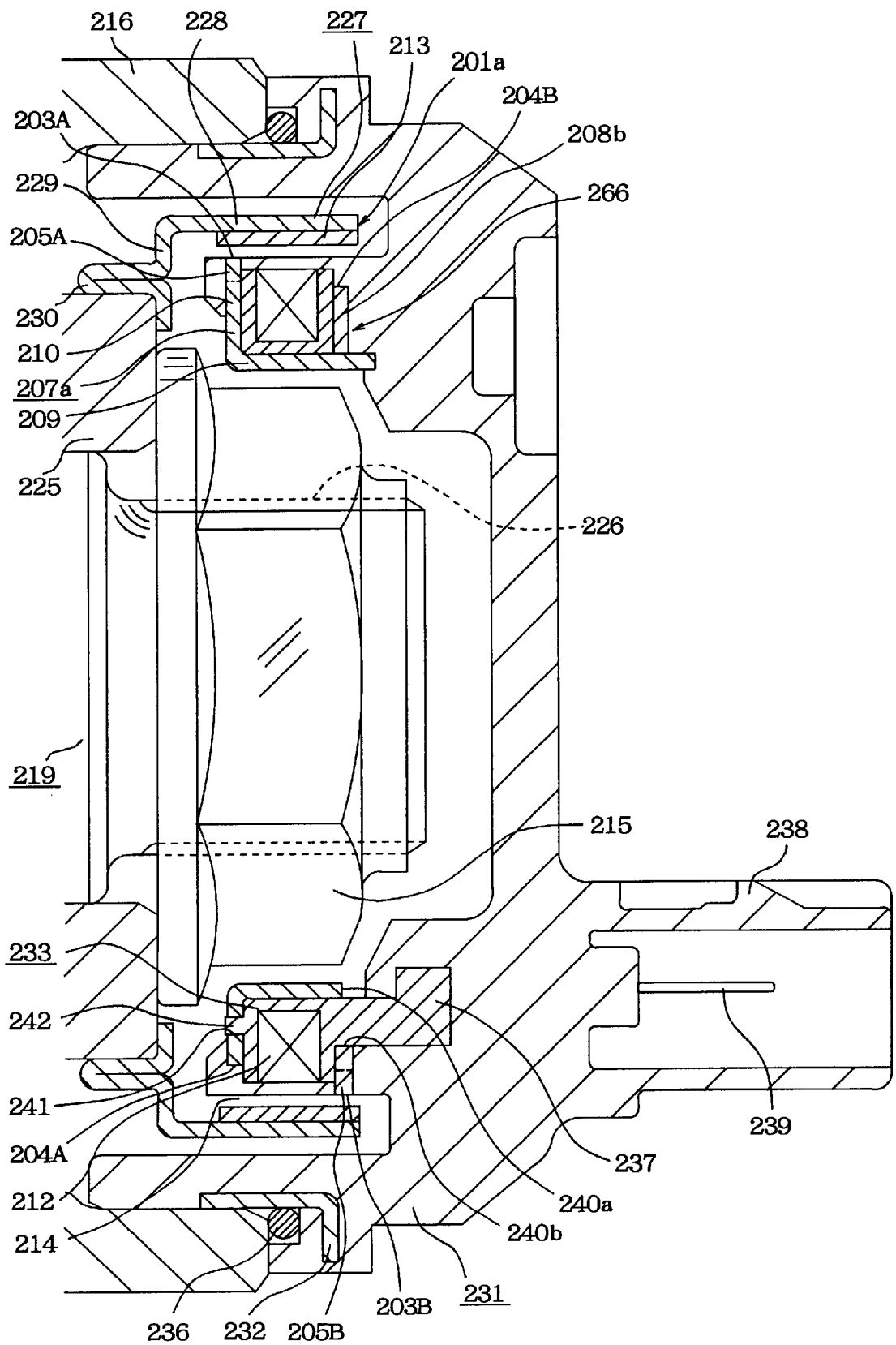
FIG. 18 is a cross sectional view similar to FIG. 16 showing another example.

FIG. 18 shows a second example of the present embodiment, where the shape of the second stator element 208*b* of the sensor 206*b* is different from that of the first example. Specifically, the second stator element 208*b* of this example does not have the short cylindrical portion 235 as shown in FIGS. 15 to 17, instead has a simple circular ring shape. Accordingly, the axial length of the stator 206*b* can be shortened than that of the first example. The other structures and operations are substantially the sane as those of the first example.

In the examples in the present embodiment, the combtooth-shaped edge portions 205A, 205B on the outer periphery of the first and second stator elements 207*a*, 208*a*, 208*b* has a linear cross section. However, it is possible to bend at right angles the outer periphery of the stator elements 207*a*, 208*a*, 208*b* so that the combtooth edge portion is formed in the bent portion as in the structure of FIG. 14. In this structure, there is an advantage that the opposing area between the combtooth-shaped edge portion and the inner peripheral surface of the permanent magnet of the encoder is enlarged to increase the amount of magnetic flux flowing through the first and second stators and to make the sensor output large.

What is claimed is:

1. A bearing unit integral with an annular sensor comprising:

(a) a stationary outer ring having an end portion and an inner peripheral surface formed with an outer raceway, (b) a rotatable inner ring having a groove shoulder end portion and an outer peripheral surface formed with an inner raceway, (c) a sensor holder member fixed to the end portion of the stationary outer ring, (d) an annular detected member fixed to the groove shoulder end portion of the inner ring, having a detected portion with a magnetic property changing circumferentially, and made of a magnet, and (e) an annular sensor supported by the sensor holder member and comprising an annular stator for magnetism transmission made of a magnetic member and having two detecting portions each formed with a plurality of cutouts circumferentially, and an annular coil for transforming the magnetic change to voltage, (f) the detected portion of the annular detected member being radially opposed to the detecting portion of the annular stator through a clearance therebetween, and (g) the detected portion being opposed to the coil with the clearance therebetween.

2. A bearing unit integral with an annular sensor comprising:

(a) a stationary outer ring having an end portion and an inner peripheral surface formed with an outer raceway, (b) a rotatable inner ring having a groove shoulder end portion and an outer peripheral surface formed with an inner raceway, (c) a sensor holder member fixed to the end portion of the stationary outer ring, (d) an annular detected member fixed to the groove shoulder end portion of the inner ring, having a detected portion with a magnetic property changing circumferentially, and made of a magnet, and (e) an annular sensor supported by the sensor holder member and comprising an annular stator for magnetism transmission made of a magnetic member and having a detecting portion formed with a plurality of cutouts circumferentially, and an annular coil for transforming the magnetic change to voltage, (f) the detected portion of the annular detected member being radially opposed to the detecting portion of the annular stator through a clearance therebetween, (g) the detected portion being opposed to the coil with the clearance therebetween, and (h) the detected portion being opposed to the detecting portion at a portion axially closer to the bearing interior at least than the coil.

3. A bearing unit integral with an annular sensor comprising:

(a) a stationary outer ring having an end portion and an inner peripheral surface formed with an outer raceway, (b) a rotatable inner ring having an end face, a groove shoulder end portion and an outer peripheral surface formed with an inner raceway, (c) a sensor holder member fixed to the end portion of the stationary outer ring, (d) an annular detected member fixed to the groove shoulder end portion of the inner ring, having a detected portion with a magnetic property changing circumferentially, and made of a magnet, and (e) an annular sensor supported by the sensor holder member and comprising an annular stator for magnetism transmission made of a magnetic member and having a detecting portion formed with a plurality of cutouts circumferentially, and an annular coil for transforming the magnetic change to voltage, (f) the detected portion of the annular detected member being opposed to the detecting portion of the annular stator through a clearance therebetween, (g) the detected portion being opposed to the coil with the clearance therebetween, and (h) the coil being located outside the end face of the inner ring.

4. The bearing unit of claim 3, wherein the detected member is fixed to an outer periphery of the inner ring.

5. The bearing unit of claim 3, wherein the detected member has a support plate.

6. A bearing unit integral with an annular sensor comprising:

(a) a stationary outer ring having an end portion and an inner peripheral surface formed with an outer raceway, (b) a rotatable inner ring having a groove shoulder end portion and an outer peripheral surface formed with an inner raceway, (c) a sensor holder member fixed to the end portion of the stationary outer ring, (d) an annular detected member fixed to the groove shoulder end portion of the inner ring, having a detected portion with a magnetic property changing circumferentially, and made of a magnet, and (e) an annular sensor supported by the sensor holder member and comprising an annular stator for magnetism transmission made of a magnetic member and having two detecting portions each formed with a plurality of cutouts circumferentially, and an annular coil for transforming the magnetic change to voltage, (f) the detected portion of the annular detected member being opposed to the detecting portion of the annular stator through a clearance therebetween, (g) the detected portion being opposed to the coil with the clearance therebetween, and (h) the detected member having a rear surface on which a magnetic member plate is mounted.

* * * * *